(12) United States Patent
Palan et al.

(10) Patent No.: US 10,715,457 B2
(45) Date of Patent: Jul. 14, 2020

(54) COORDINATION OF PROCESSES IN CLOUD COMPUTING ENVIRONMENTS

(71) Applicant: Oracle International Corporation, Redwood Shores, CA (US)

(72) Inventors: Kiran Palan, Santa Clara, CA (US); Willem Robert Van Biljon, Cape Town (SA); Vividh Siddha, Sunnyvale, CA (US); Jay Judkowitz, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/459,104

(22) Filed: Aug. 13, 2014

(65) Prior Publication Data

US 2015/0120936 A1 Apr. 30, 2015

Related U.S. Application Data

(63) Continuation of application No. PCT/US2013/025211, filed on Feb. 7, 2013, and a
(Continued)

(30) Foreign Application Priority Data

Feb. 7, 2013 (WO) ................. PCT/US2013/025211

(51) Int. Cl.
*H04L 12/911* (2013.01)
*G06F 21/62* (2013.01)
(Continued)

(52) U.S. Cl.
CPC .......... *H04L 47/70* (2013.01); *G06F 21/6218* (2013.01); *G06Q 10/0631* (2013.01);
(Continued)

(58) Field of Classification Search
CPC ............ G06F 15/177; G06F 17/30557; G06F 2009/45562; G06F 9/44505;
(Continued)

(56) References Cited

U.S. PATENT DOCUMENTS

| 4,086,628 A | 4/1978 | Woodrum |
| 5,239,648 A | 8/1993 | Nukui |

(Continued)

FOREIGN PATENT DOCUMENTS

| CN | 101969475 | 2/2011 |
| CN | 102223398 | 10/2011 |

(Continued)

OTHER PUBLICATIONS

U.S. Appl. No. 13/299,206 Notice of Allowance dated Dec. 19, 2014, 10 pages.

(Continued)

*Primary Examiner* — Chris Parry
*Assistant Examiner* — Kristoffer L S Sayoc
(74) *Attorney, Agent, or Firm* — Kilpatrick Townsend & Stockton LLP

(57) ABSTRACT

Methods and systems of managing computer cloud resources, including at least one database, at least one server configured to, act as an orchestration site, wherein the orchestration site is configured to receive at least one cloud resource management plan from at least one user and store the at least one plan in the at least one database and act as an orchestration manager. The orchestration manager is configured to retrieve the at least one plan from the at least one database and execute the plan with at least one site controller.

20 Claims, 7 Drawing Sheets

Related U.S. Application Data continuation-in-part of application No. 13/299,004, filed on Nov. 17, 2011, now Pat. No. 8,850,528, which is a continuation of application No. PCT/US2011/040590, filed on Jun. 15, 2011, application No. 14/459,104, which is a continuation-in-part of application No. 13/299,066, filed on Nov. 17, 2011, now Pat. No. 9,218,616, which is a continuation of application No. PCT/US2011/040590, filed on Jun. 15, 2011, application No. 14/459,104, which is a continuation-in-part of application No. 13/299,157, filed on Nov. 17, 2011, now Pat. No. 9,076,168, which is a continuation of application No. PCT/US2011/040590, filed on Jun. 15, 2011, application No. 14/459,104, which is a continuation-in-part of application No. 13/299,206, filed on Nov. 17, 2011, now Pat. No. 9,021,009, which is a continuation of application No. PCT/US2011/040590, filed on Jun. 15, 2011, application No. 14/459,104, which is a continuation-in-part of application No. 13/299,262, filed on Nov. 17, 2011, now Pat. No. 9,087,352, which is a continuation of application No. PCT/US2011/040590, filed on Jun. 15, 2011, application No. 14/459,104, which is a continuation-in-part of application No. 13/299,287, filed on Nov. 17, 2011, now Pat. No. 8,977,679, which is a continuation of application No. PCT/US2011/040590, filed on Jun. 15, 2011, application No. 14/459,104, which is a continuation-in-part of application No. 13/299,301, filed on Nov. 17, 2011, now Pat. No. 9,171,323, which is a continuation of application No. PCT/US2011/040590, filed on Jun. 15, 2011, application No. 14/459,104, which is a continuation-in-part of application No. 13/299,319, filed on Nov. 17, 2011, now Pat. No. 9,032,069, which is a continuation of application No. PCT/US2011/040590, filed on Jun. 15, 2011, application No. 14/459,104, which is a continuation-in-part of application No. 13/299,335, filed on Nov. 17, 2011, now Pat. No. 8,938,540, which is a continuation of application No. PCT/US2011/040590, filed on Jun. 15, 2011, application No. 14/459,104, which is a continuation-in-part of application No. 13/299,339, filed on Nov. 17, 2011, now Pat. No. 9,202,239, which is a continuation of application No. PCT/US2011/040590, filed on Jun. 15, 2011.

(60) Provisional application No. 61/598,305, filed on Feb. 13, 2012, provisional application No. 61/355,078, filed on Jun. 15, 2010.

(51) Int. Cl.
*H04L 12/24* (2006.01)
*G06Q 10/06* (2012.01)

(52) U.S. Cl.
CPC .. *H04L 41/5045* (2013.01); *G06F 2221/2141* (2013.01); *G06F 2221/2145* (2013.01); *H04L 41/5096* (2013.01)

(58) Field of Classification Search
CPC ............ G06F 21/6218; G06F 11/3404; G06F 2221/2141; G06F 2221/2145; H04L 47/70; H04L 41/5045; H04L 41/5096; G06Q 10/0631
USPC ................................. 709/219, 226
See application file for complete search history.

(56) References Cited

U.S. PATENT DOCUMENTS

| | | |
|---|---|---|
| 5,463,774 A | 10/1995 | Jenness |
| 5,832,505 A | 11/1998 | Kasso et al. |
| 5,987,506 A | 11/1999 | Carter et al. |
| 6,038,399 A | 3/2000 | Fisher et al. |
| 6,047,129 A | 4/2000 | Frye |
| 6,233,017 B1 | 5/2001 | Chaddha |
| 6,473,800 B1 | 10/2002 | Jerger et al. |
| 6,772,350 B1 | 8/2004 | Belani et al. |
| 6,944,777 B1 | 9/2005 | Belani et al. |
| 7,200,865 B1 | 4/2007 | Roscoe et al. |
| 7,225,210 B2 | 5/2007 | Guthrie, II |
| 7,366,793 B2 | 4/2008 | Kenner et al. |
| 7,475,419 B1 | 1/2009 | Basu et al. |
| 7,602,756 B2 | 10/2009 | Gu et al. |
| 7,631,306 B1 | 12/2009 | Puig et al. |
| 7,734,643 B1 | 6/2010 | Waterhouse et al. |
| 7,886,038 B2 | 2/2011 | Ferris |
| 7,890,626 B1 | 2/2011 | Gadir |
| 7,921,452 B2 | 4/2011 | Ridlon et al. |
| 7,953,823 B2 | 5/2011 | Rider et al. |
| 7,958,246 B2 | 6/2011 | Barber |
| 8,037,108 B1 | 10/2011 | Chang |
| 8,086,177 B2 | 12/2011 | Trift et al. |
| 8,108,377 B2 | 1/2012 | Jiang et al. |
| 8,112,505 B1 | 2/2012 | Ben-Shaul et al. |
| 8,201,175 B2 | 6/2012 | Zhu |
| 8,209,415 B2 | 6/2012 | Wei |
| 8,291,079 B1 | 10/2012 | Colton et al. |
| 8,341,141 B2 | 12/2012 | Krislov |
| 8,347,263 B1 | 1/2013 | Offer |
| 8,429,162 B1 | 4/2013 | Wang et al. |
| 8,438,654 B1 | 5/2013 | von Eicken et al. |
| 8,464,250 B1 | 6/2013 | Ansel |
| 8,468,455 B2 | 6/2013 | Jorgensen et al. |
| 8,472,438 B2 | 6/2013 | Kini et al. |
| 8,495,611 B2 | 7/2013 | McCarthy et al. |
| 8,504,689 B2 | 8/2013 | Ferris et al. |
| 8,509,231 B2 | 8/2013 | Hoole et al. |
| 8,577,937 B1 | 11/2013 | Offer |
| 8,584,215 B2 | 11/2013 | Narasimha et al. |
| 8,650,152 B2 | 2/2014 | Dettinger et al. |
| 8,850,528 B2 | 9/2014 | Van Biljon et al. |
| 8,938,540 B2 | 1/2015 | Van Biljon et al. |
| 8,977,679 B2 | 3/2015 | Van Biljon et al. |
| 9,021,009 B2 | 4/2015 | Van Biljon et al. |
| 9,032,069 B2 | 5/2015 | Van Biljon et al. |
| 9,076,168 B2 | 7/2015 | Van Biljon et al. |
| 9,087,352 B2 | 7/2015 | Van Biljon et al. |
| 9,171,323 B2 | 10/2015 | Van Biljon et al. |
| 9,202,239 B2 | 12/2015 | Van Biljon et al. |
| 9,218,616 B2 | 12/2015 | Van Biljon et al. |
| 9,232,000 B1 | 1/2016 | Pittman |
| 9,619,545 B2 | 4/2017 | Hardy et al. |
| 9,767,494 B2 | 9/2017 | Van Biljon et al. |
| 2002/0052941 A1 | 5/2002 | Patterson |
| 2002/0097747 A1 | 7/2002 | Kirkby et al. |
| 2003/0018927 A1 | 1/2003 | Gadir et al. |
| 2003/0037284 A1 | 2/2003 | Srinivasan et al. |
| 2003/0105810 A1 | 6/2003 | McCrory et al. |
| 2003/0229623 A1 | 12/2003 | Chang et al. |
| 2004/0024892 A1 | 2/2004 | Creswell et al. |
| 2004/0184070 A1 | 9/2004 | Kiraly et al. |
| 2004/0250120 A1 | 12/2004 | Ng |
| 2005/0038834 A1 | 2/2005 | Souder et al. |
| 2005/0055306 A1 | 3/2005 | Miller et al. |
| 2005/0065855 A1 | 3/2005 | Geller |
| 2005/0187937 A1 | 8/2005 | Kawabe et al. |
| 2005/0193218 A1 | 9/2005 | Susser et al. |
| 2005/0278441 A1* | 12/2005 | Bond ............... G06F 9/5027 709/223 |
| 2006/0112176 A1 | 5/2006 | Liu et al. |
| 2006/0209868 A1 | 9/2006 | Callaghan |
| 2006/0212545 A1 | 9/2006 | Nichols et al. |
| 2006/0259947 A1 | 11/2006 | Aarnos et al. |
| 2007/0072591 A1 | 3/2007 | McGary et al. |

(56) References Cited

U.S. PATENT DOCUMENTS

| | | |
|---|---|---|
| 2007/0162456 A1 | 7/2007 | Agassi et al. |
| 2007/0234332 A1 | 10/2007 | Bundridge et al. |
| 2007/0255798 A1* | 11/2007 | Schneider ............. G06F 9/5077 709/217 |
| 2008/0052203 A1 | 2/2008 | Beyer et al. |
| 2008/0195760 A1 | 8/2008 | Nudler |
| 2008/0228734 A1 | 9/2008 | Kang |
| 2008/0295094 A1 | 11/2008 | Korupolu et al. |
| 2008/0316980 A1 | 12/2008 | Ahlen et al. |
| 2009/0024522 A1 | 1/2009 | Reunert et al. |
| 2009/0172662 A1* | 7/2009 | Liu .................... G06F 9/44505 718/1 |
| 2009/0182622 A1 | 7/2009 | Agarwal et al. |
| 2009/0210429 A1 | 8/2009 | Agrawal et al. |
| 2009/0228950 A1 | 9/2009 | Reed et al. |
| 2009/0235342 A1 | 9/2009 | Manion et al. |
| 2009/0240728 A1 | 9/2009 | Shukla et al. |
| 2009/0276771 A1* | 11/2009 | Nickolov ............. G06F 9/4856 717/177 |
| 2009/0300210 A1 | 12/2009 | Ferris |
| 2009/0300350 A1 | 12/2009 | Gai et al. |
| 2009/0319529 A1 | 12/2009 | Bartlett et al. |
| 2009/0327471 A1 | 12/2009 | Astete et al. |
| 2010/0036736 A1 | 2/2010 | McGee et al. |
| 2010/0042720 A1 | 2/2010 | Stienhans et al. |
| 2010/0061391 A1 | 3/2010 | Sindhu et al. |
| 2010/0070501 A1 | 3/2010 | Walsh et al. |
| 2010/0071035 A1 | 3/2010 | Budko et al. |
| 2010/0083004 A1 | 4/2010 | Kirshenbaum |
| 2010/0114714 A1 | 5/2010 | Vitek |
| 2010/0161717 A1 | 6/2010 | Albrecht et al. |
| 2010/0169477 A1 | 7/2010 | Stienhans et al. |
| 2010/0180014 A1 | 7/2010 | Kannan et al. |
| 2010/0185455 A1 | 7/2010 | Miller |
| 2010/0194963 A1 | 8/2010 | Terashima |
| 2010/0197267 A1 | 8/2010 | Raleigh |
| 2010/0198972 A1 | 8/2010 | Umbehocker |
| 2010/0217840 A1 | 8/2010 | Dehaan et al. |
| 2010/0223385 A1 | 9/2010 | Gulley et al. |
| 2010/0250748 A1 | 9/2010 | Sivasubramanian et al. |
| 2010/0250956 A1 | 9/2010 | Reed et al. |
| 2010/0251242 A1 | 9/2010 | Sivasubramanian et al. |
| 2010/0269109 A1 | 10/2010 | Cartales |
| 2010/0274769 A1 | 10/2010 | Hazlewood et al. |
| 2010/0275059 A1 | 10/2010 | Hazlewood et al. |
| 2010/0318645 A1 | 12/2010 | Hoole et al. |
| 2010/0332629 A1 | 12/2010 | Cotugno et al. |
| 2011/0016214 A1 | 1/2011 | Jackson |
| 2011/0022652 A1 | 1/2011 | Lai et al. |
| 2011/0022812 A1 | 1/2011 | van der Linden et al. |
| 2011/0055034 A1 | 3/2011 | Ferris et al. |
| 2011/0055378 A1 | 3/2011 | Ferris et al. |
| 2011/0055399 A1* | 3/2011 | Tung .................... G06F 9/5072 709/226 |
| 2011/0055712 A1 | 3/2011 | Tung et al. |
| 2011/0078679 A1 | 3/2011 | Bozek et al. |
| 2011/0096174 A1 | 4/2011 | King et al. |
| 2011/0099146 A1 | 4/2011 | McAlister et al. |
| 2011/0106875 A1 | 5/2011 | Koenig |
| 2011/0119381 A1 | 5/2011 | Glover et al. |
| 2011/0126047 A1 | 5/2011 | Anderson et al. |
| 2011/0126168 A1 | 5/2011 | Ilyayev |
| 2011/0126197 A1† | 5/2011 | Larsen |
| 2011/0185063 A1 | 7/2011 | Head et al. |
| 2011/0191610 A1 | 8/2011 | Agarwal et al. |
| 2011/0209064 A1 | 8/2011 | Jorgensen et al. |
| 2011/0213687 A1 | 9/2011 | Ferris et al. |
| 2011/0214124 A1 | 9/2011 | Ferris et al. |
| 2011/0225299 A1 | 9/2011 | Nathuji et al. |
| 2011/0225467 A1 | 9/2011 | Betzler et al. |
| 2011/0231525 A1 | 9/2011 | Balani et al. |
| 2011/0231899 A1 | 9/2011 | Pulier et al. |
| 2011/0243553 A1 | 10/2011 | Russell |
| 2011/0246253 A1 | 10/2011 | Yu et al. |
| 2011/0246984 A1 | 10/2011 | Sharp et al. |
| 2011/0258692 A1 | 10/2011 | Morrison et al. |
| 2011/0265081 A1 | 10/2011 | Lucovsky et al. |
| 2011/0265147 A1 | 10/2011 | Liu |
| 2011/0265164 A1 | 10/2011 | Lucovsky et al. |
| 2011/0270721 A1 | 11/2011 | Kusterer |
| 2011/0270968 A1 | 11/2011 | Salsburg et al. |
| 2011/0274110 A1 | 11/2011 | Mmmadi et al. |
| 2011/0282832 A1 | 11/2011 | Rishel et al. |
| 2011/0282940 A1 | 11/2011 | Zhang et al. |
| 2011/0295999 A1 | 12/2011 | Ferris et al. |
| 2011/0296019 A1 | 12/2011 | Ferris et al. |
| 2011/0307391 A1 | 12/2011 | Mercuri et al. |
| 2011/0307899 A1 | 12/2011 | Lee et al. |
| 2012/0017112 A1 | 1/2012 | Broda et al. |
| 2012/0030069 A1 | 2/2012 | Garg et al. |
| 2012/0030672 A1 | 2/2012 | Zygmuntowicz et al. |
| 2012/0047239 A1 | 2/2012 | Donahue et al. |
| 2012/0072985 A1 | 3/2012 | Davne et al. |
| 2012/0078849 A1 | 3/2012 | Bryant et al. |
| 2012/0079276 A1 | 3/2012 | Evans et al. |
| 2012/0096158 A1 | 4/2012 | Astete et al. |
| 2012/0110055 A1 | 5/2012 | Van Biljon et al. |
| 2012/0110056 A1 | 5/2012 | Van Biljon et al. |
| 2012/0110180 A1 | 5/2012 | Van Biljon et al. |
| 2012/0110188 A1 | 5/2012 | Van Biljon et al. |
| 2012/0110636 A1 | 5/2012 | Van Biljon et al. |
| 2012/0110650 A1 | 5/2012 | Van Biljon et al. |
| 2012/0110651 A1 | 5/2012 | Van Biljon et al. |
| 2012/0116937 A1 | 5/2012 | Van Biljon et al. |
| 2012/0117229 A1 | 5/2012 | Van Biljon et al. |
| 2012/0124211 A1 | 5/2012 | Kampas et al. |
| 2012/0150791 A1 | 6/2012 | Willson |
| 2012/0185913 A1 | 7/2012 | Martinez et al. |
| 2012/0221603 A1 | 8/2012 | Kothule et al. |
| 2012/0246646 A1 | 9/2012 | Bakman |
| 2012/0259815 A1 | 10/2012 | Olson |
| 2012/0310880 A1 | 12/2012 | Giampaolo et al. |
| 2012/0310991 A1 | 12/2012 | Frantz et al. |
| 2013/0019015 A1 | 1/2013 | Devarakonda et al. |
| 2013/0030853 A1 | 1/2013 | Agarwal et al. |
| 2013/0036213 A1 | 2/2013 | Hasan et al. |
| 2013/0060839 A1 | 3/2013 | Van Biljon et al. |
| 2013/0111033 A1* | 5/2013 | Mao .................... G06F 9/5072 709/226 |
| 2013/0125217 A1 | 5/2013 | Edwards et al. |
| 2013/0173798 A1 | 7/2013 | Micucci et al. |
| 2013/0227560 A1* | 8/2013 | McGrath ............. G06F 9/45558 718/1 |
| 2015/0006482 A1 | 1/2015 | Hardy et al. |
| 2015/0264121 A1 | 9/2015 | Van Biljon et al. |
| 2016/0197843 A1 | 7/2016 | Palan et al. |
| 2017/0364973 A1 | 12/2017 | Van Biljon et al. |

FOREIGN PATENT DOCUMENTS

| | | |
|---|---|---|
| CN | 103488697 | 1/2014 |
| CN | 104303175 | 1/2015 |
| CN | 104335179 | 2/2015 |
| CN | 105339940 A | 2/2016 |
| CN | 104335179 B | 1/2018 |
| CN | 104303175 | 6/2018 |
| EP | 2583211 | 4/2013 |
| EP | 2812809 | 12/2014 |
| EP | 2815346 | 12/2014 |
| EP | 3014485 | 5/2016 |
| JP | 2015507301 | 3/2015 |
| JP | 2015512091 | 4/2015 |
| JP | 2016524255 | 8/2016 |
| JP | 6231020 | 11/2017 |
| WO | 2009151729 | 12/2009 |
| WO | WO2011159842 A2 | 12/2011 |
| WO | 2011159842 | 3/2012 |
| WO | 2012167108 | 12/2012 |
| WO | 2013119841 | 8/2013 |

(56) References Cited

FOREIGN PATENT DOCUMENTS

| WO | 2013122815 | 8/2013 |
|---|---|---|
| WO | 2014209848 | 12/2014 |

OTHER PUBLICATIONS

U.S. Appl. No. 13/299,319 Notice of Allowance dated Jan. 13, 2015, 9 pages.
European Search Report for Application No. EP 13748986 dated Sep. 8, 2015, 7 pages.
International Preliminary Report on Patentability for Application No. PCT/US2014/043599, dated Jan. 7, 2016, 8 pages.
International Search Report and Written Opinion for Application No. PCT/US2014/043599, dated Oct. 14, 2014, 11 pages.
U.S. Appl. No. 13/299,066, Notice of Allowance dated Jul. 31, 2015, 23 pages.
U.S. Appl. No. 13/299,301, Notice of Allowance dated Jun. 12, 2015, 5 pages.
U.S. Appl. No. 13/299,339, Notice of Allowance dated Apr. 21, 2015, 17 pages.
Baron Schwartz et al., "High Performance MySQL: Optimization, Backups, Replication, and More", Jun. 2008, pp. 428-429.
Liu et al., "NIST Cloud Computing Reference Architecture", NIST Special Publication 500-292, Sep. 8, 2011, 35 pages.
M-T Schmidt et al., "The Enterprise Service Bus: Making service-oriented acrrhitecture real", IBM Systems Journal, vol. 44, No. 4, Oct. 1, 2005, pp. 781-797.
International Application No. PCT/US2011/040590, International Preliminary Report on Patentability dated Jan. 3, 2013, 11 pages.
International Application No. PCT/US2013/025186, International Preliminary Report on Patentability dated Aug. 21, 2014, 6 pages.
U.S. Appl. No. 13/299,287, Corrected Notice of Allowability dated Oct. 15, 2014, 2 pages.
U.S. Appl. No. 13/299,335, Corrected Notice of Allowability dated Oct. 6, 2014, 4 pages.
U.S. Appl. No. 13/299,339, Notice of Allowance dated Jun. 27, 2014, 17 pages.
U.S. Appl. No. 13/299,301, Final Office Action dated Jan. 29, 2015, 13 pages.
U.S. Appl. No. 13/299,262, Notice of Allowance dated Mar. 3, 2015, 10 pages.
U.S. Appl. No. 13/299,157, Notice of Allowance dated Feb. 27, 2015, 9 pages.
U.S. Appl. No. 13/299,066, Non-Final Office Action dated Mar. 19, 2015, 17 pages.
International Search Report for application PCT/US2013/025186 (dated Apr. 19, 2013).
International Search Report for application PCT/US2013/025211 (dated Apr. 16, 2013).
International Search Report for application PCT/US11/040590 (dated Jan. 5, 2012).
Karjoth, Gunter, "Access Control with IBM Trivoli Access", May 2003, IBM Research, Zurich Research Laboratory, vol. 6, No. 2.
Canetti et al. "Practical delegation of computation using multiple servers," CCS '11 Proceedings of the 18th ACM conference on Computer and communications security, pp. 445-454(Oct. 2011).
U.S. Appl. No. 13/299,004, Non-Final Office Action dated Apr. 15, 2013, 58 pages.
U.S. Appl. No. 13/299,004, Final Office Action dated Oct. 2, 2013, 42 pages.
U.S. Appl. No. 13/299,066 Non-Final Office Action dated Apr. 12, 2013, 26 pages.
U.S. Appl. No. 13/299,066, Final Office Action dated Oct. 22, 2013, 25 pages.
U.S. Appl. No. 13/299,157, Non-Final Office Action dated May 24, 2013, 14 pages.
U.S. Appl. No. 13/299,157 Final Office Action dated Dec. 5, 2013, 9 pages.
U.S. Appl. No. 13/299,262, Non-Final Office Action dated May 2, 2013, 12 pages.
U.S. Appl. No. 13/299,262, Final Office Action dated Oct. 30, 2013, 11 pages.
U.S. Appl. No. 13/299,287, Non-Final Office Action dated Oct. 28, 2013, 18 pages.
U.S. Appl. No. 13/299,335, Non-Final Office Action dated Nov. 22, 2013, 24 pages.
U.S. Appl. No. 13/299,339, Non-Final Office Action dated Nov. 16, 2012, 12 pages.
U.S. Appl. No. 13/299,339, Final Office Action dated Aug. 7, 2013, 16 pages.
U.S. Appl. No. 13/299,066, Non-Final Office Action dated Mar. 12, 2014, 16 pages.
U.S. Appl. No. 13/299,004, Notice of Allowance dated Mar. 24, 2014, 22 pages.
U.S. Appl. No. 13/299,335, Notice of Allowance dated May 1, 2014, 7 pages.
U.S. Appl. No. 13/299,206, Non-Final Office Action dated May 22, 2014, 10 pages.
U.S. Appl. No. 13/299,287, Final Office Action dated May 23, 2014, 12 pages.
U.S. Appl. No. 13/299,301, Non-Final Office Action dated Jun. 12, 2014, 18 pages.
U.S. Appl. No. 13/299,319, Non-Final Office Action dated Jun. 6, 2014, 13 pages.
International Preliminary Report on Patentability for application PCT/US2013/025211 (dated Aug. 28, 2014).
U.S. Appl. No. 13/299,066, Final Office Action dated Jul. 18, 2014, 19 pages.
U.S. Appl. No. 13/299,335, Notice of Allowance dated Jul. 18, 2014, 7 pages.
U.S. Appl. No. 13/299,339, Non-Final Office Action dated Sep. 3, 2014, 8 pages.
U.S. Appl. No. 13/299,287, Notice of Allowance dated Sep. 16, 2014, 16 pages.
U.S. Appl. No. 13/299,335, Notice of Allowance dated Sep. 15, 2014, 10 pages.
U.S. Appl. No. 13/299,262, Non-Final Office Action dated Nov. 17, 2014, 14 pages.
U.S. Appl. No. 13/299,157 Non-Final Office Action dated Dec. 3, 2014, 10 pages.
"A White Paper from the Open Cloud Standards", Interoperable Clouds, Version: 1.0.0, Nov. 11, 2009, pp. 1-21.
"Managing VMware VirtualCenter Roles and Permissions", Retrieved from the Internet: URL:http//www/vmware.com/pdf/vi3_vc_roles.pdf, Apr. 4, 2007, 15 pages.
"VMware Virtual Networking Concepts", Retrieved from the internet: https://www.vmware.com/files/pdf/virtual_networking_concepts.pdf, Jul. 18, 2007, 12 pages.
Danwei et al., "Access Control of Cloud Service Based on UCON", Cloud Computing, Springer Berlin Heidelberg, Dec. 1, 2009, pp. 559-564.
EP11796398.3 , "Extended European Search Report", dated May 25, 2016, 14 pages.
EP11796398.3, "Partial Supplementary European Search Report", Apr. 7, 2016, 6 pages.
EP13746545.6 , "Extended European Search Report", Apr. 26, 2016, 8 pages.
Fitzpatrick , "Tonido Keeps Cloud Computing Local", Retrieved from the Internet: URL:http:f/lifehacker.com/5208833/tonido-keeps-cloud-computing-local, Apr. 13, 2009, 2 pages.
Thain et al., "Distributed Computing in Practice: The Condor Experience", Concurrency and Computation: Practice and Experience, vol. 17, Jan. 1, 2005, 37 pages.
U.S. Appl. No. 14/226,557, "Non-Final Office Action", dated May 19, 2016, 9 pages.
U.S. Appl. No. 14/724,043, "Non-Final Office Action", dated Jun. 16, 2016, 24 pages.
Chinese Application No. 201380014187.4, Office Action dated May 27, 2016, 14 pages (6 pages of Original document and 8 pages of English Translation).

(56) References Cited

OTHER PUBLICATIONS

U.S. Appl. No. 14/377,811, Non-Final Office Action dated Jul. 15, 2016, 17 pages.
U.S. Appl. No. 14/377,811, "Final Office Action", dated Mar. 23, 2017, 14 pages.
U.S. Appl. No. 14/724,043, "Non-Final Office Action", dated Dec. 30, 2016, 12 pages.
U.S. Appl. No. 13/299,004, Notice of Allowability dated Aug. 28, 2014, 2 pages.
U.S. Appl. No. 13/299,066, Advisory Action dated Jan. 31, 2014, 2 pages.
U.S. Appl. No. 13/299,262, Advisory Action dated Jan. 16, 2014, 3 pages.
U.S. Appl. No. 13/299,287, Corrected Notice of Allowability dated Feb. 12, 2015, 2 pages.
U.S. Appl. No. 13/299,335, Corrected Notice of Allowability dated Dec. 19, 2014, 4 pages.
U.S. Appl. No. 14/377,811, Non-Final Office Action dated Oct. 18, 2017, 13 pages.
U.S. Appl. No. 14/724,043, Notice of Allowance dated May 19, 2017, 10 pages.
Chinese Application No. 201380014187.4, Office Action dated Aug. 17, 2017, 15 pages. (8 pages of English translation and 7 pages of Original document).
Chinese Application No. 201380014746.1, Notice of Decision to Grant dated Oct. 11, 2017, 3 pages (1 page for the original document and 2 pages for the English translation).
European Application No. 11796398.3, Office Action dated Aug. 8, 2017, 4 pages.
European Application No. 13746545.6, Office Action dated Jun. 22, 2017, 7 pages.
Japanese Application No. 2014-556683, Office Action dated Oct. 17, 2017, 9 pages (5 pages for the original document and 4 pages for the English translation).
Japanese Application No. 2014-556691, Notice of Allowance dated Sep. 26, 2017. 6 pages (3 pages for the original document and 3 pages for the English translation).
Japanese Application No. 2014-556691, Office Action dated Jan. 31, 2017. 9 pages (5 pages for the original document and 4 pages for the English translation).
U.S. Appl. No. 13/299,004, Notice of Allowance dated Mar. 24, 2014, 17 pages.
U.S. Appl. No. 14/226,557, Notice of Allowance dated Nov. 25, 2016, 9 pages.
U.S. Appl. No. 14/377,811, Final Office Action dated Mar. 1, 2018, 9 pages.
U.S. Appl. No. 14/377,811, Non-Final Office Action dated Oct. 29, 2018, 9 pages.
European Application No. 13746545.6, Summons to Attend Oral Proceedings mailed on Apr. 25, 2018, 8 pages.
U.S. Appl. No. 15/692,929, Non-Final Office Action dated Jun. 14, 2018, 10 pages.
Chinese Application No. 201480036405.9, Office Action dated Jun. 15, 2018, 15 pages (6 pages for the original document and 9 pages for the English translation).
European Application No. 11796398.3, Office Action dated Mar. 26, 2018, 5 pages.
European Application No. 13748986.0, Office Action dated Apr. 24, 2018, 8 pages.
European Application No. 14740064.2, Office Action dated Aug. 8, 2018, 7 Pages.
Hewitt, Cassandra: The Definitive Guide, Distributed Data at web Scale, O'Reilly Media, Nov. 2010, 330 pages.
Japanese Application No. 2014-556683, Office Action dated Jun. 5, 2018, 6 pages (3 pages for the original document and 3 pages for the English translation).
Japanese Application No. 2016-523825, Office Action dated Jul. 31, 2018, 4 pages (3 pages for the original document and 1 page for the English translation).
"Notice of Allowance" issued in U.S. Appl. No. 14/377,811, dated Mar. 11, 2019, 13 pages.
U.S. Appl. No. 15/692,929, Notice of Allowance dated Jan. 9, 2019, 10 pages.
European Application No. 11796398.3, Office Action dated Dec. 3, 2018, 4 pages.
India Application No. 6185/CHEN/2014, "First Examination report", dated Dec. 24, 2019, 6 pages.
India Application No. 6165/CHEN/2014, "First Examination report", dated Dec. 24, 2019, 6 pages.

\* cited by examiner
† cited by third party

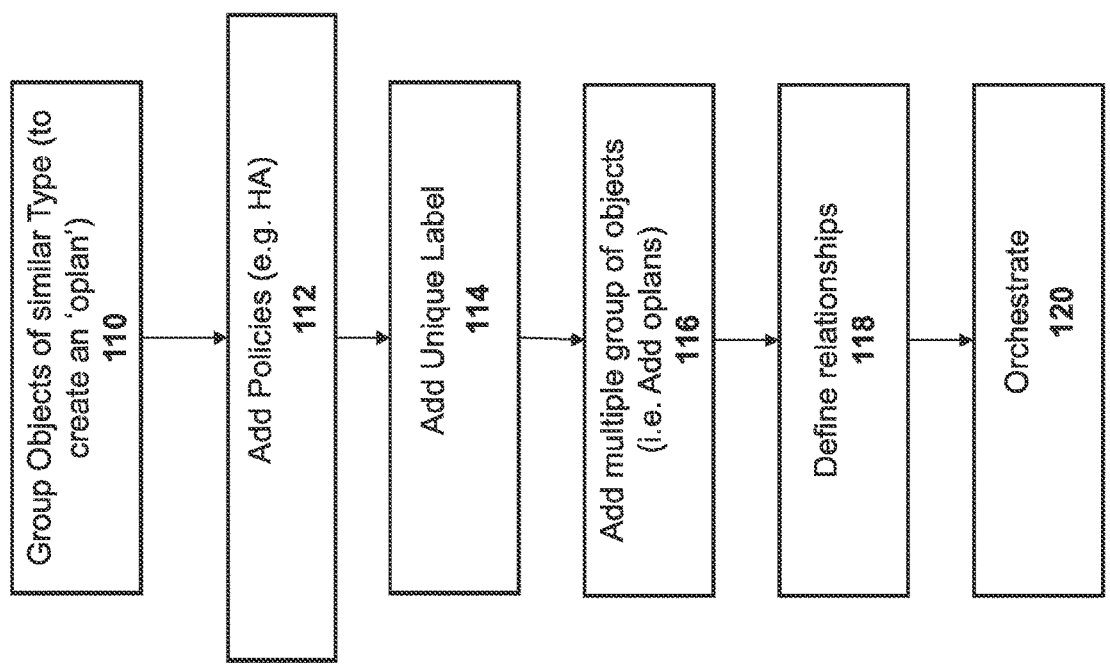

COORDINATION OF PROCESSES IN CLOUD COMPUTING ENVIRONMENTS

CROSS-REFERENCE TO RELATED APPLICATIONS

This application is a continuation of International Application No. PCT/US2013/025211, filed Feb. 7, 2013, titled "COORDINATION OF PROCESSES IN CLOUD COMPUTING ENVIRONMENTS", which claims the benefit and priority under 35 U.S.C. 119(e) from U.S. Provisional Application No. 61/598,305, filed Feb. 13, 2012, titled "COORDINATION OF PROCESSES IN CLOUD COMPUTING ENVIRONMENTS."

This application is a Continuation-in-Part of the following applications:

(1) U.S. application Ser. No. 13/299,004, filed Nov. 17, 2011, titled ORGANIZING PERMISSION ASSOCIATED WITH A CLOUD CUSTOMER IN A VIRTUAL COMPUTING INFRASTRUCTURE", which is a continuation of Application No. PCT/US2011/040590, filed Jun. 15, 2011, titled "VIRTUAL COMPUTING INFRASTRUCTURE", which claims the benefit and priority under 35 U.S.C. 119(e) from U.S. Provisional Application No. 61/355,078, filed Jun. 15, 2010, titled "VIRTUAL COMPUTING INFRASTRUCTURE".

(2) U.S. application Ser. No. 13/299,066, filed Nov. 17, 2011, titled "GRANTING ACCESS TO A CLOUD COMPUTING ENVIRONMENT USING NAMES IN A VIRTUAL COMPUTING INFRASTRUCTURE", which is a continuation of Application No. PCT/US2011/040590, filed Jun. 15, 2011, titled "VIRTUAL COMPUTING INFRASTRUCTURE", which claims the benefit and priority under 35 U.S.C. 119(e) from U.S. Provisional Application No. 61/355,078, filed Jun. 15, 2010, titled "VIRTUAL COMPUTING INFRASTRUCTURE".

(3) U.S. application Ser. No. 13/299,157, filed Nov. 17, 2011, titled "DEFINING AN AUTHORIZER IN A VIRTUAL COMPUTING INFRASTRUCTURE", which is a continuation of Application No. PCT/US2011/040590, filed Jun. 15, 2011, titled "VIRTUAL COMPUTING INFRASTRUCTURE", which claims the benefit and priority under 35 U.S.C. 119(e) from U.S. Provisional Application No. 61/355,078, filed Jun. 15, 2010, titled "VIRTUAL COMPUTING INFRASTRUCTURE".

(4) U.S. application Ser. No. 13/299,206, filed Nov. 17, 2011, titled "BUILDING A CLOUD COMPUTING ENVIRONMENT USING A SEED DEVICE IN A VIRTUAL COMPUTING INFRASTRUCTURE", which is a continuation of Application No. PCT/US2011/040590, filed Jun. 15, 2011, titled "VIRTUAL COMPUTING INFRASTRUCTURE", which claims the benefit and priority under 35 U.S.C. 119(e) from U.S. Provisional Application No. 61/355,078, filed Jun. 15, 2010, titled "VIRTUAL COMPUTING INFRASTRUCTURE".

(5) U.S. application Ser. No. 13/299,262, filed Nov. 17, 2011, titled "OBJECTS IN A VIRTUAL COMPUTING INFRASTRUCTURE", which is a continuation of Application No. PCT/US2011/040590, filed Jun. 15, 2011, titled "VIRTUAL COMPUTING INFRASTRUCTURE", which claims the benefit and priority under 35 U.S.C. 119(e) from U.S. Provisional Application No. 61/355,078, filed Jun. 15, 2010, titled "VIRTUAL COMPUTING INFRASTRUCTURE".

(6) U.S. application Ser. No. 13/299,287, filed Nov. 17, 2011, titled "LAUNCHING AN INSTANCE IN A VIRTUAL COMPUTING INFRASTRUCTURE", which is a continuation of Application No. PCT/US2011/040590, filed Jun. 15, 2011, titled "VIRTUAL COMPUTING INFRASTRUCTURE", which claims the benefit and priority under 35 U.S.C. 119(e) from U.S. Provisional Application No. 61/355,078, filed Jun. 15, 2010, titled "VIRTUAL COMPUTING INFRASTRUCTURE".

(7) U.S. application Ser. No. 13/299,301, filed Nov. 17, 2011, titled "ORGANIZING DATA IN A VIRTUAL COMPUTING INFRASTRUCTURE", which is a continuation of Application No. PCT/US2011/040590, filed Jun. 15, 2011, titled "VIRTUAL COMPUTING INFRASTRUCTURE", which claims the benefit and priority under 35 U.S.C. 119(e) from U.S. Provisional Application No. 61/355,078, filed Jun. 15, 2010, titled "VIRTUAL COMPUTING INFRASTRUCTURE".

(8) U.S. application Ser. No. 13/299,319, filed Nov. 17, 2011, titled "VIRTUALIZATION LAYER IN A VIRTUAL COMPUTING INFRASTRUCTURE", which is a continuation of Application No. PCT/US2011/040590, filed Jun. 15, 2011, titled "VIRTUAL COMPUTING INFRASTRUCTURE", which claims the benefit and priority under 35 U.S.C. 119(e) from U.S. Provisional Application No. 61/355,078, filed Jun. 15, 2010, titled "VIRTUAL COMPUTING INFRASTRUCTURE".

(9) U.S. application Ser. No. 13/299,335, filed Nov. 17, 2011, titled "NETWORKING IN A VIRTUAL COMPUTING INFRASTRUCTURE", which is a continuation of Application No. PCT/US2011/040590, filed Jun. 15, 2011, titled "VIRTUAL COMPUTING INFRASTRUCTURE", which claims the benefit and priority under 35 U.S.C. 119(e) from U.S. Provisional Application No. 61/355,078, filed Jun. 15, 2010, titled "VIRTUAL COMPUTING INFRASTRUCTURE".

(10) U.S. application Ser. No. 13/299,339, filed Nov. 17, 2011, titled "BILLING USAGE IN A VIRTUAL COMPUTING INFRASTRUCTURE", which is a continuation of Application No. PCT/US2011/040590, filed Jun. 15, 2011, titled "VIRTUAL COMPUTING INFRASTRUCTURE", which claims the benefit and priority under 35 U.S.C. 119(e) from U.S. Provisional Application No. 61/355,078, filed Jun. 15, 2010, titled "VIRTUAL COMPUTING INFRASTRUCTURE".

FIELD

The present invention relates to cloud computing. More particularly, the present invention relates to the coordination of processes in cloud computing.

BACKGROUND OF THE INVENTION

Cloud computing is a way for users to store data and operate computational processes on infrastructure connected by a network. Thus, instead of having to purchase physical infrastructure, users send processes and data out to be run and stored on infrastructure owned by other entities. The user only pays for the amount of data storage or processing capability that he or she desires. This allows the user to tap computing resources that would be impossible without owning actual, physical and vast computing resources. Cloud computing opens up great possibilities because of the many resources available. But, by its very nature, the cloud computing has so many tools and resources that it is difficult to organize efficiently.

BRIEF SUMMARY OF THE INVENTION

Systems and methods of managing computer cloud resources, may comprise receiving, via at least one server acting as an orchestration site, at least one cloud resource management plan from at least one user and storing, via the at least one server, the at least one plan in at least one storage and retrieving, via the at least one server acting as an orchestration manager, the at least one plan from at the at least one database, and executing the plan, via the at least one server, with at least one site controller.

Examples of these may also include where the orchestration site and the orchestration manager are further configured to communicate over a distributed messaging bus. Also, where the communication includes information regarding whether the at least one plan is ready for execution.

Still other examples include where the at least one plan includes at least one group of cloud resources. And where the at least one group includes at least one cloud resource and a policy regarding the at least one resource.

Some examples may include where the plan includes information regarding the interaction of the at least one group with other groups. Also, where the plan includes a name of the plan. And where the at least one site controller includes a computer cloud resource. Yet others may include where the storage is at least one of a database and cloud storage.

Examples may also include where the system and methods include at least one cloud resource management plan includes instructions including configuring a master orchestration to drive at least one sub orchestration. Also where a cloud resource includes at least one of, a third party provided object and third party provided cloud service.

Other embodiments include where the cloud resource is, or is a combination of, a virtual machine, a physical machine, an operating system, storage service, networking service, and an application service.

BRIEF DESCRIPTION OF THE DRAWINGS

For a better understanding of the embodiments described in this application, reference should be made to the description below, in conjunction with the following drawings in which like reference numerals refer to corresponding parts throughout the figures.

FIG. 1 is an overview of the steps required to create an orchestration according to some embodiments.

DETAILED DESCRIPTION OF THE INVENTION

Figures 2A, 2B:
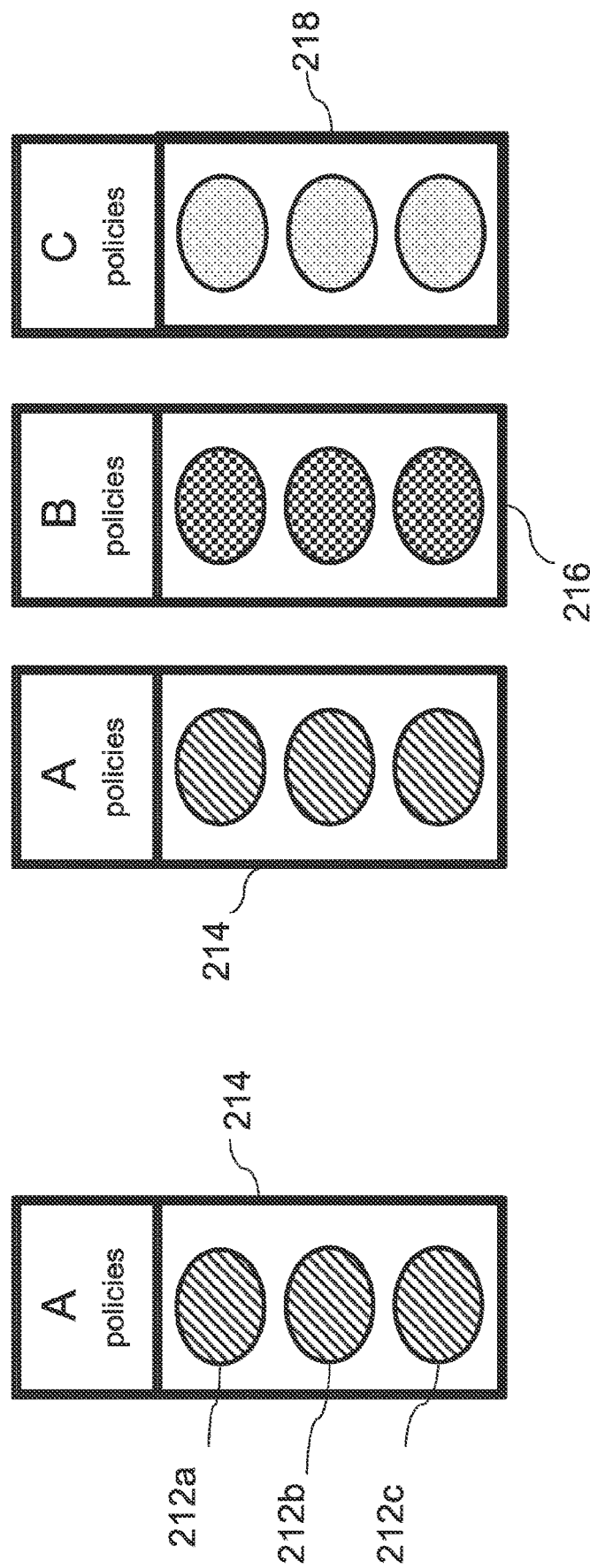
FIGS. 2(a) to (c) illustrate the steps of FIG. 1 schematically with reference to various objects in cloud computing according to some embodiments.

In the following detailed descriptions, numerous specific details are set forth to illustrate the subject matter presented in this document. It will, however, be apparent to one of ordinary skill in the art that the subject matter may be practiced without these exact specific details. Moreover, the descriptions are provided by way of example and should not be used to limit the scope of any later claimed inventions.

Computer networks of many kinds exist today. Closed and proprietary networks, open and public networks, and hybrid networks as well. These networks tie together computer servers and databases in ways that allow computer programs to run efficiently. Some embodiments of such networks are known as "cloud computing." Over such a network, such as the internet, computer resources such as infrastructure, platforms and applications can all be used by client users. The physical resources of such cloud networks may be scattered around various physical locations, but by being networked together, can become a larger resource. Various systems and methods can be used to manage the resources that can be hosted and run on such a cloud network.

The technology described in this document seeks to address this by allowing users to coordinate their cloud computing in order to become efficient, coherent, redundant, interdependent, and secure. This Orchestration' provides for the automated management of user-defined system components for high availability, monitoring, and persistence allowing users to troubleshoot systems, manage processes and to create and coordinate complex processes in a computing cloud, or over numerous clouds.

Orchestration is a specification by which user can specify different objects or references to other orchestrations or objects, establish relationships between them and apply different kinds of policies on them. These objects include but are not limited to all first class features provided by the cloud and Cloud Services Extensions added to the cloud. Different kind of relationships can be specified, "dependency" is one example of a relationship. Different kinds of policies can be applied. "high-availability (HA) and autoscaling" are few examples of such policies. User can co-ordinate several processes on the same, multiple or public clouds. These processes may include any functionality/objects provided by the cloud. Example: security policies, storage co-ordination, networking, actual CRs (computational resources which includes but is not limited to a virtual machine, OS container or an actual physical machine), new cloud services/extensions enabled on the cloud, etc.

User can create/add his own orchestration which may contain the potpourri of his desired objects or contain references to other orchestrations. The user can establish relationships between different kinds of objects/references and apply policies example: HA. After the User has created his orchestration, he can start the orchestration. When the orchestration is started, the cloud objects are orchestrated according to the specifications in the orchestration. The Orchestration is the coordination of the objects. A single orchestration can even create and manage other orchestrations. For example, a Master Orchestration can drive three children orchestrations, each of those three of their own children, and so on, creating a compounding or mushrooming effect.

Just as objects can have dependencies among and between them, entire orchestrations can do the same. In this way, not only separate objects are coordinated, but orchestrations, more complex series of objects run in concert are then coordinated. A Cloud administrator can set up users and groups this way as well as security, or other processes. Different kinds of relationships can be defined among and between the objects and orchestrations. It is important to bear in mind that usually, a user admin/user/developer etc can specify only cloud objects on which he/she has permissions. All existing security mechanisms including permissions, access, keys on each individual cloud objects are honored. For example: a cloud admin can orchestrate users/ groups/networks etc while another user can orchestrate CRs (virtual machines, OS containers etc.) and they can even co-ordinate Cloud Services.

Different kind of policies can be applied on cloud objects. Policies include but are not limited to High Availability (apply different policies if they go away e.g.—recreate them on same/another cloud etc.), Monitoring (monitor the state of the objects), Autoscaling (scale the objects up or down based on certain criteria). Cloud can provide its own implementation of these policies or a user /cloud-admin can create custom policies.

Thus, orchestration ties together cloud computing components into a single, manageable collection for the user. For example, with orchestration a user can associate networks, network security, and storage with the instantiation of a Computational Resource, which includes, but is not limited to a Virtual Machine, OS containers or an actual physical machine. This instantiation can be restarted automatically if it terminates for some reason, it can be monitored, or it can be disabled. In addition, a user can specify dependencies to affect the sequence of how components are orchestrated.

Overview

In overview, the steps for creating an orchestration are illustrated in FIG. 1. Specifically, a user group 110 objects of similar type to create an orchestration plan or Op lan.' Thereafter, 112, the user adds one or more policies, for example 'high availability" (HA) to the specific oplan. Then, 114, the user adds a unique label to the oplan. Once that is done, the user adds additional groupings of similarly created bur differently functioning, oplans, 116. At this stage, 118, the user defines the relationships between the added oplans and thereafter, 120, has created an Orchestration.' Thus, an orchestration is a group of objects. As will be shown below, it can also have other orchestrations as objects.

Figure 2C:
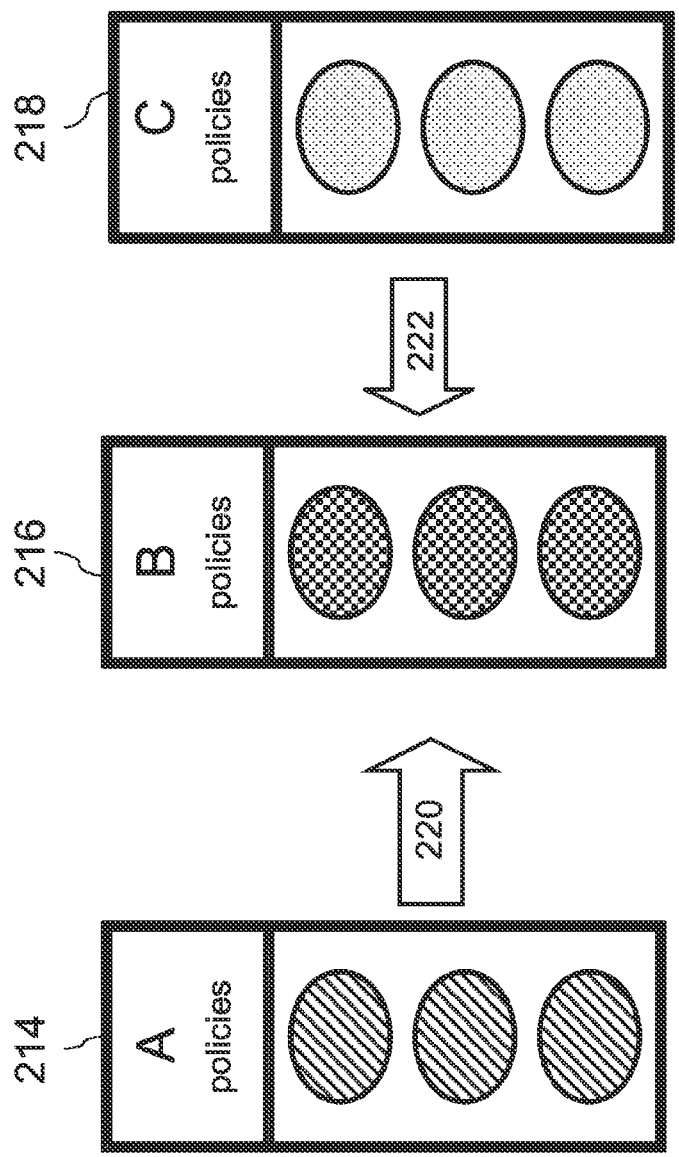

FIGS. 2(a) to (c) illustrate these processes with reference to cloud computing objects shown schematically. In FIG. 2(a), a user (not shown) has grouped objects 212a, 212b, and 212c of similar type into an orchestration plan 214. The user has added one or more policies, shown schematically as "policies," and added a unique label A in this case to the oplan.

In FIG. 2(b), the user has added (in this illustration, two) other of similarly created but differently functioning, oplans 216 and 218, each with their own name (B, C respectively) and 'policies.' Then, as shown in FIG. 2(c), the user has defined relationships 220 and 222, which may or may not be the same relationships, respectively between oplans 214 and 216 and 216 and 218. This results in an overall orchestration 224.

The orchestration model therefore represents a grouping of objects, namely: oplans: is a fully listed sub collection of oplans described below; status: overall status for this orchestration; and relationships: list of relationships. This defines the relationships between two or more oplans. [Omicron] [Kappa] o2 or o2>ol' would implies an order in which ol should be before o2. If a dependency fails then subsequent oplans will not be started.

Also, for the above, it will be apparent that the oplan represents an orchestration plan for a specific object and that it only exists as part of an orchestration. It may include a number of attributes, including: obj type: refers to the type of the object. It is nothing but the base path for other models in the system. Examples: launchplan, vservice/vdhcpservice etc.; objects: List of object dictionaries or names of obj type. See examples below; status: status for this oplan; and ha_policy: if a user wants an object to persist, for example with instances, launchplans, etc., the user can apply an HA policy here. It is possible to support 3 policies—disabled, monitor and active, in which disabled: means that the object will not monitored at all. (This is the default policy); monitor: monitor the object and just report error when something goes wrong; and active: monitor the object and if it is not found or in error state, keep trying to create it again or bring it back to a sane state.

Figure 3:
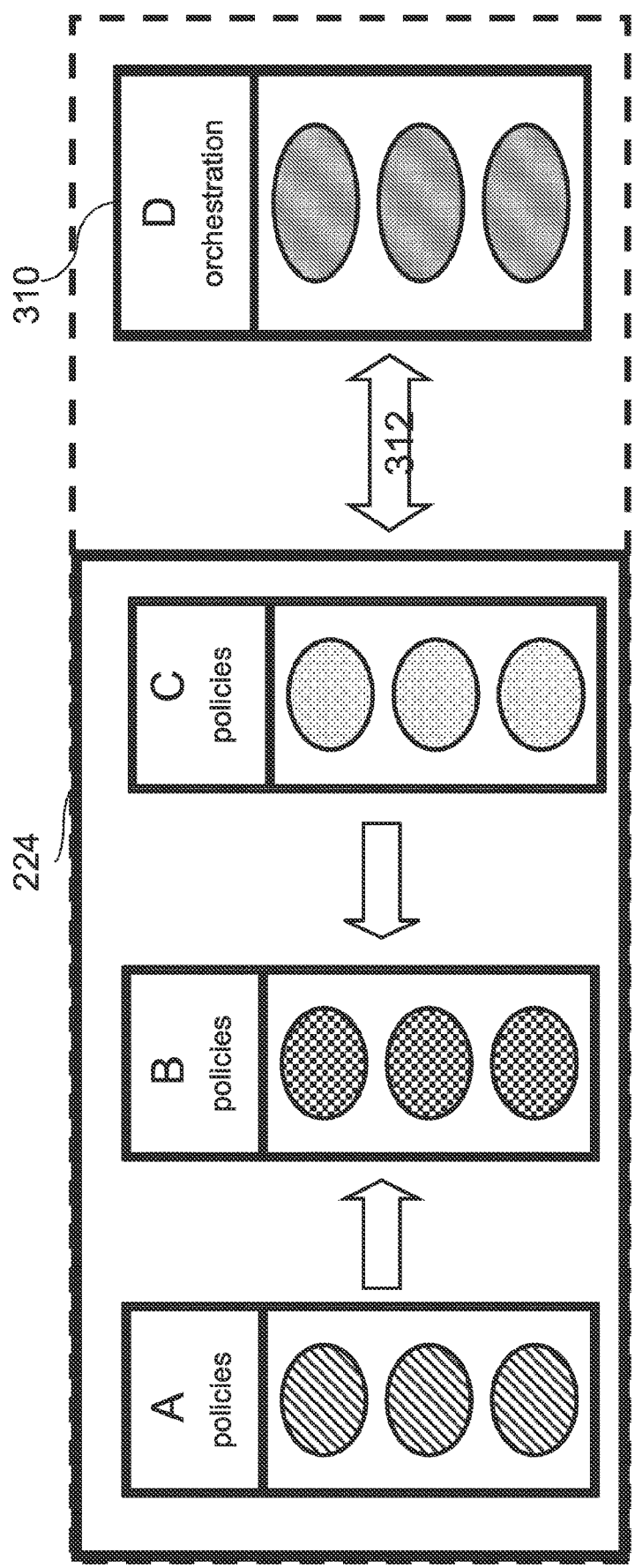
FIG. 3 is an expansion of FIG. 2 showing how an orchestration can be joined to another orchestration according to some embodiments.

As is illustrated in FIG. 3, this concept can be expanded even further so that a single orchestration, for example orchestration 224 created with reference to FIG. 2; can have another orchestration 310 as an object. As before this added orchestration 310 will itself have a unique label "D" and policies at the orchestration level and will also have a defined relationship 312 with the orchestration 224 created with reference to FIG. 2. Thus a single orchestration can drive other orchestrations.

Figure 4:
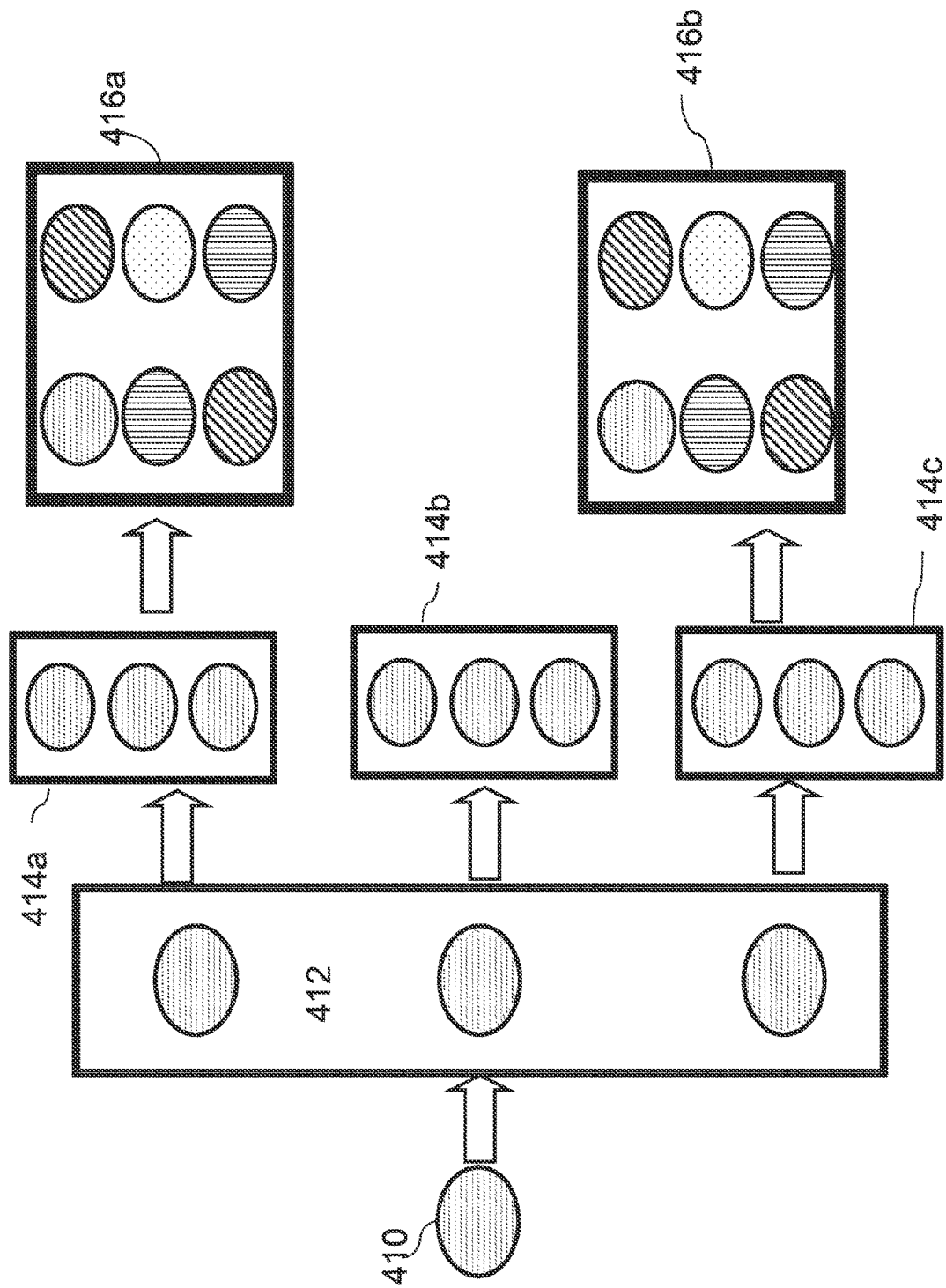
FIG. 4 is still a further expansion of FIGS. 2 and 3, showing multiple layers of orchestrations driving other orchestrations according to some embodiments.

Moreover, as illustrated in FIG. 4, a single master object 410 can drive an orchestration 412, which can itself drive other orchestrations 414a, 414b and 414c. These orchestrations 414a, 414b and 414c can themselves drive even other orchestrations 416a and 416b, etc, thus creating an ever expanding "mushroom effect."

Figure 5:
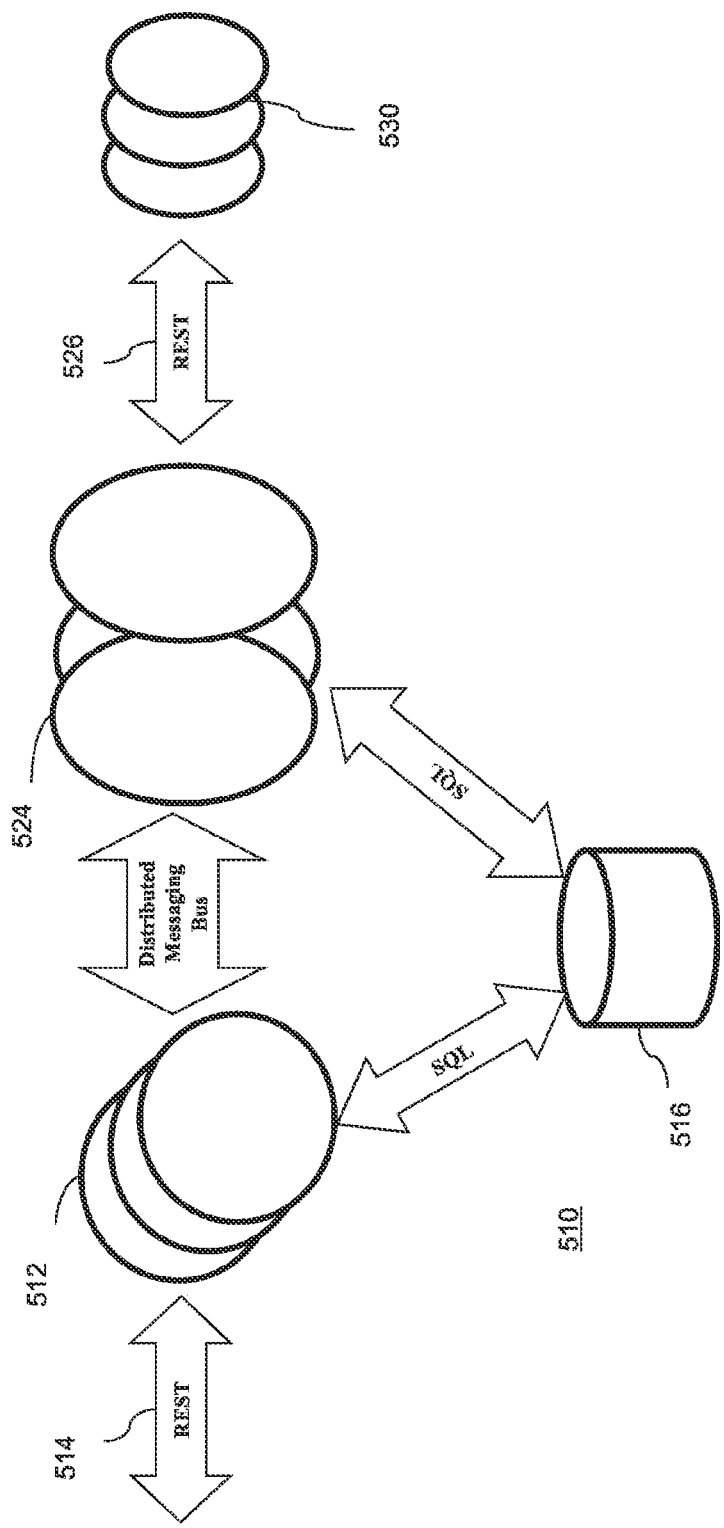
FIG. 5 is a schematic overview of a system on which these orchestrations can run according to some embodiments.

A system for implementing the technology described in this document is shown in FIG. 5. Specifically, the system 510 has two main components, i.e. site controller, orchestration site 512, which functions to expose the Web API (e.g., REST, SOAP, etc.) interface 514. It also adds/deletes an orchestration to/from the storage such as a database (DB) 516 and assigns it to one of the orchestration managers 524. The storage could also be cloud storage. In addition, a manager, orchestration manager 524 manages the actual orchestration by Restfully or otherwise managing 526 objects providing 'high availability' (HA), monitoring and other features. This figure also shows a plurality of controllers, site controllers 530. This publish subscribe mechanism can exist on the same cloud or across clouds.

Figure 6:
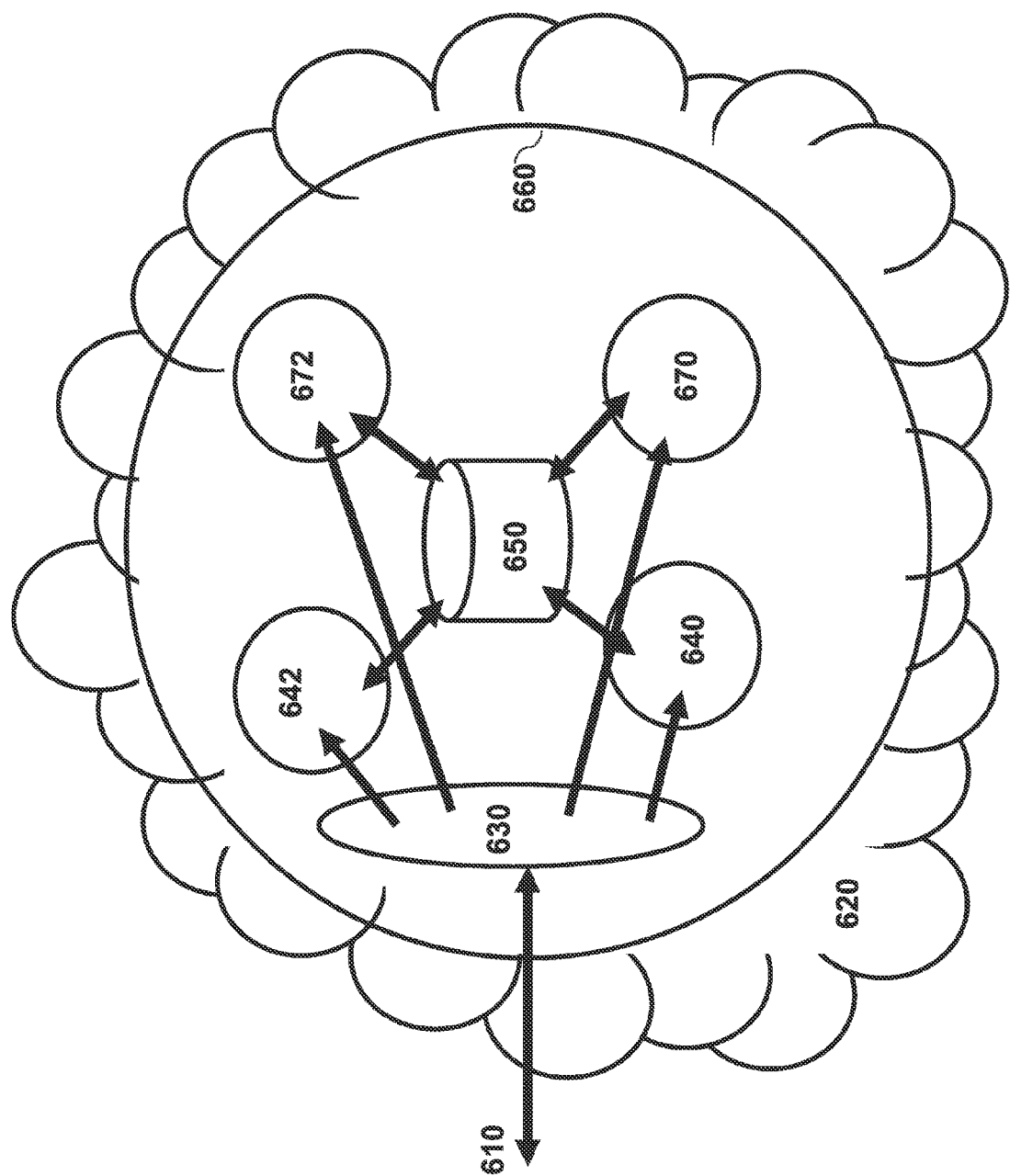
FIG. 6 is a schematic illustrating an alternate structure of a cloud computing system, suitable for use with the orchestration techniques described herein according to some embodiments.

FIG. 6 is a schematic illustrating an alternate structure of a cloud computing system, suitable for use with the orchestration techniques described herein. In this figure, the APIs, 610 are used to communicate to the cloud 620 through a distributing load balancer 630. The load balancer, 630 distributes services to different Orchestration Managers, 640, 642, which are each in communication with a distributed database system, distributed data store, 650. A Messaging Service 660 coordinates the communication among the distributed database system, Orchestration Managers 670, 672 and the Load Balancer 630 on the cloud 620 and among other possible clouds (not shown).

As will be described more fully below, this system allows a user to group together a plurality of objects and to orchestrate a number of common functions, such as add/ get/delete/update; monitor status; provide High Availability; specify relationships between different objects and auto-scale certain objects, for example, instances and cloud services.

The use of this system and the methods described above will now be described with reference to specific, non-limiting examples.

Working with Orchestration

As described, orchestration is the automated management of user-defined system components for high availability, monitoring, and persistence. Orchestrations can be available via a Web API/CLI/UI but they can be extended to other interfaces. For example, in a non limiting example, one can work with orchestrations either with web console or the command line: The web console is sufficient for basic, simple orchestrations. More complex orchestrations can be stored in a JSON file and then added, started, stopped or deleted with the nimbula-api command.

These specific examples should not be seen as limiting. Thus, orchestrations can be specified in any document/object specification language, for example: JSON/YAML/XML, etc.

To illustrate, the following topics are explored below: a simple orchestration; a generalized process for orchestrating; the status of an orchestration; the number of components, specifying dependencies, and nesting orchestrations; an example of working with orchestration on the command line; and orchestration with Amazon EC2. While this example considers EC2, it should be noted that a single orchestration can span private and public clouds. Amazon EC2 is just one of the examples. After that additional features are also explored.

A Simple Orchestration

One example includes starting a virtual machine, where the name of the machine image list and the desired shape are known. From the command line, for example, an orchestration may be started as shown in the following example.

nimbula-api orchestrate simple /acme/imagelists/lucdi64 medium

Complete details about nimbula-api orchestrate simple, including how to specify a high availability policy and number of instances and other orchestration-related commands, are in the The system Command-line Interface Reference, the details of which are incorporated herein by reference.

Generalized Process for Orchestrating

A basic illustrative process of working with orchestrations is as follows:
  i. Create the orchestration, containing the following at a minimum. For use on the command line, an orchestration is stored in a file in JSON format; see Orchestration with Amazon EC2. [Importantly, this JSON example and the later CLI example are is just two of the multiple ways in which this can be accomplished.]
    Its name.
    Its "high availability policy": active, monitor or none.
    The types of objects to orchestrate, such as instance configuration, virtual Ethernet, permission, security lists, and others.
    Additional information depending on the object type.
  ii. Add the orchestration to the system.
  iii. Start the orchestration.
  iv. Monitor, update, stop, or delete the orchestration.

Policies

As indicated above, one can specify various policies for an orchestration. [Clouds too can specify their own policies and they can be applied to an oplan.] For example, one can specify one of three high availability policies for an orchestration, which affects how it is managed by the system. High Availability is the ability to orchestrate redundant processes in case of balancing problems, failure situations, or other changes in circumstance, it allows for a flexible and fail-safe series of objects run in orchestration.

| Policy for high availability | Meaning |
| --- | --- |
| active | The orchestration is restarted if it stops unexpectedly. |
| monitor | The orchestration is not restarted, it is monitored. |
| none | The orchestration is neither restarted nor monitored. |

In general, at a minimum a user must have use permission on all objects he or she refers to in an orchestration; otherwise, the orchestration will not start, correctly.

Orchestratable Components, User and Object Permissions, and Object Creation

Any object/functionality/feature provided by the cloud is supported. References to other orchestrations or objects are also supported. It also supports object/functionality which is dynamically added to a cloud.

These are also the valid values for the obj type field in an orchestration in JSON format that one craft by hand; see Orchestration with Amazon EC2 and Orchestrations in JSON format described below. Also, in general, at a minimum one must have user and object permission on all objects one refer to in an orchestration; otherwise, the orchestration will not start.

Unless they were created beforehand, the network, storage, security list, or other objects referred to in an orchestration are created when the orchestration starts and destroyed when the orchestration stops. For nested orchestrations (see Nesting orchestrations), only objects at the top level (the master orchestration) are created and destroyed at start and stop.

Status of an Orchestration

The state of an orchestration changes overtime. Starting or stopping an orchestration starts or stops the object it defines; this is asynchronous so some time might be required to fully start or stop. One can watch the orchestration to see the changes.

As a non-limiting example, the possible states of an orchestration could be (this as an example and an orchestration can reflect the following status, although it is not limited to only these):

| State | Description |
| --- | --- |
| Starting | Orchestration is beginning. |
| Started | Orchestrated is fully started. |
| Ready | Orchestration is running. |
| Stopping | Orchestration is terminating. |
| Stopped | Orchestration is fully stopped. |

Number of Components, Specifying Dependencies, and Nesting Orchestrations

In any single orchestration, one can include many components. Moreover, an orchestration can include references to other "nested" orchestrations so there is no effective limit on the number of components. For an example of nested orchestrations, see Nesting orchestrations. One can specify the sequence in which the components in an orchestration start their dependencies on one another. For an example, see the section on Multiple objects with dependencies.

Example of Working with Orchestration on the Command Line

This section is an example of working with a simple orchestration to add, start, monitor, and stop the instantiation of virtual machine. Full details about syntax and parameters on nimbula-api for orchestration are in the system Command-line Interface Director Command-line Interface Reference.

The orchestration in this example is shown in Basic orchestration: configuring an instance and stored in a file called lp1.json.
  i. Add the orchestration to the system.
    The name of the orchestration is specified in the JSON file itself This example uses the -fjson option to display the output fully.

After adding, the status of the orchestration is "stopped." nimbula-api add orchestration lp1.json -fjson -u /acme/joeuser

```
{
  "list": [
    {
      "account": "/acme/default",
      "description": "",
      "info": { },
      "name": "/acme/joeuser/lp1 ",
      "oplans": [
        {
          "ha_policy": "active",
          "info": { },
          "label": "launchplan1 ",
          "obj_type": "launchplan",
          "objects": [
            {
              "instances": [
                {
                  "imagelist": "/nimbula/public/lucid64",
                  "label": "test_instance",
                  "shape": "small",
                  "user_data": { }
                }
              ]
            }
          ],
          "status": "stopped"
        }
      ],
      "relationships": [ ],
      "status": "stopped",
      "uri": "https://api.nimbula.example.com/orchestration/acme/joeuser/lp1"
    }
  ]
}
``` ii. Start the orchestration. The status displayed immediately after starting might be "stopped," because starting all components of an orchestration can take time is asynchronous and can take time.

```
nimbula-api start orchestration /acme/j oeuser/lp 1 -u /acme/joeuser -f json
{
  "list": [
    {
      "account": "/acme/default",
      "description": "",
      "info": { },
      "name": "/acme/joeuser/lp1 ",
      "oplans": [
        {
          "ha_policy": "active",
          "info": { },
          "label": "launchplan1 ",
          "obj_type": "launchplan",
          "objects": [
            {
              "instances": [
                {
                  "imagelist": "/nimbula/public/lucid64",
                  "label": "test_instance",
                  "shape": "small",
                  "user_data": { }
                }
              ]
            }
          ],
          "status": "stopped"
        }
      ],
      "relationships": [ ],
      "status": "starting",
```

```
      "uri": "https://api.nimbula.example.com/orchestration/acme/joeuser/lp1"
    }
  ]
}
``` iii. Watch the orchestration progress. In this example, the status has changed to "ready." Also, no errors have been reported. The orchestration is in full operation.

```
{
  "list": [
    {
      "account": "/acme/default",
      "description": "",
      "info": {
        "errors": { }
      },
      "name": "/acme/joeuser/lp1",
      "oplans": [
        {
          "ha_policy": "active",
          "info": {
            "errors": { }
          },
          "label": "launchplan1",
          "obj_type": "launchplan",
          "objects": [
            {
              "instances": [
                {
                  "imagelist": "/nimbula/public/lucid64",
                  "ip": "10.33.1.90",
                  "label": "test_instance",
                  "name": "/acme/joeuser/49dba3c0-c7b8-456a-b017-27267d3a2876"
                  "shape": "small",
                  "state": "running",
                  "user_data": { }
                }
              ]
            }
          ],
          "status": "ready"
        }
      ],
      "relationships": [ ],
      "status": "ready",
      "uri": "https://api.nimbula.example.com/orchestration/acme/joeuser/lp1"
    }
  ]
}
``` iv. Stop the orchestration. The status displayed immediately after stopping might be "ready," because stopping all components of an orchestration is asynchronous and takes time.

```
nimbula-api stop orchestration /acme/j oeuser/lp 1 -f csv
uri,name,oplans,description,account,status,info,relationships
https://api.nimbula.example.com/orchestration/acme/joeuser/lp1,/acme/joeuser/lp1 , "{""status"": ""ready"", ""info"": {""errors"": { }},
""objjype"": ""launchplan"", ""ha_policy"": ""active"", ""label"":
""launchplan1"", ""objects"": [{""instances"": [{""name"":
" /acme/j oeuser/49dba3c0-c7b8-456a- b017- 27267d3a2876"", ""ip"":
""10.33.1.90"", ""state"": ""running"", ""user data"": { }, ""shape"":
""small"", ""imagelist"": " nimbula/public/lucid64"", ""label"":
""test_instance""}] }] } ""/acme/default,stopping,"{ ""errors"": { } }",
``` v. Watch the orchestration again. The status is now "stopped."

```
nimbula-api get orchestration /acme/joeuser/lp1 -f csv
uri,name,oplans,description,account,status,info,relationships
```

-continued

```
https://api.nimbula xample om/orchestration/acme/joeuser/lpl,/acme/
joeuser/lpl , "{""status"": ""stopped"", ""info"": { }, ""objjype"":
""launchplan"", ""ha_policy"": ""active"", ""label"": ""launchplanl"",
""objects"": [{""instances"": [{""shape"": ""small"", ""user data"": { },
""imagelist"": ""/nimbula/public/lucid64"", ""label"":
" "test instance" "}]}]} ""/acme/default,stopped, { }
```

Orchestration with Amazon EC2

One can orchestrate components with Amazon EC2 or any other private/public clouds just as one normally can launch instances on EC. In the instance configuration portion of the orchestration, one need to include the site and account details in one orchestration, as shown in the following example:

```
"ha_policy": "active",
    "label": "orchestrate-ec2-
    instance", "obj_type":
    "launchplan",
    "objects": [
        {
            "instances": [
                {
                    "account": "/nimbula/ec2account",
                        "site": "ec2proxy/us-east-
                    1", "imagelist":
                    "/nimbula/public/ec2image", "label":
                    "ec2_instance",
                    "shape": "small",
                }
            ]
        }
    ]
```

Orchestration Sampler

Presented here are orchestrations in JSON format for instantiating virtual machines. Specifically, this section covers basic orchestration: configuring an instance and a complete annotated instance configuration. As will be shown later under a separate heading, orchestrations in JSON format as several other orchestrations for a variety of uses.
Basic Orchestration: Configuring an Instance This orchestration has a single object: a plan to instantiate a virtual machine from the default machine image stored in the image list /nimbula/public/lucid64 on a small shape. The high availability policy is set to active.

```
{
    "name": "/acme/groupl/basic_launch",
    "oplans": [
        {
            "ha_policy": "active",
            "label": "launchplanl ",
            "obj_type": "launchplan",
            "objects": [
                {
                    "instances": [
                        {
                            "imagelist": "/acme/public/lucid64",
                            "label": "test_instance",
                            "shape": "small"
                        }
                    ]
                }
            ]
        }
    ]
}
```

It is to be noted that while this example centers around a virtual machine, it could also apply to any Computational Resources (CRs). Any higher level application services like load balancers, AutoScaling, DNS, Platform As a Service (PaaS) provided by the cloud vendor or 3<rd>party cloud service developers Complete Annotated CR Configuration An orchestration can describe the various instances to be launched, the relationships among them, and their networking, storage, and security characteristics. Below is an orchestration for a single instance of a primary and secondary web server that must run on different nodes and a primary and secondary database. The example is of a CR configuration on a specific cloud, but it is important to realize that orchestrations are not limited to any specific clouds. They span cloud implementations, multiple clouds, hybrid clouds, etc.

The elements of this example orchestration are detailed after the listing.

```
{
"description": "Orchestrate e-commerce
application", "name": "/acme/mary/sample",
"oplans": [
    {
    "ha_policy": "active",
    "label": "EvalGuide_servers",
    "obj_type": "launchplan",
    "objects": [
        {
        "instances": [
            {
            "block_devices": { },
            "imagelist": "/acme/mary/webserver",
            "label": "Web server front-end to OS Commerce: web
            server #1", "networking": {
                "eth-0": {
                "dns": [
                    "www"
                ],
                "seclists": [
                    "/acme/mary/webserver_list"
                ]
                }
            },
            "shape": "small",
            "storage_attachments": [ ]
            },
            {
            "block_devices": { },
            "imagelist": "/acme/mary/webserver",
            "label": "Web server front-end to OS Commerce: web
            server #2", "networking": {
                "eth0": { "dns":
                    [
                    "www"
                    ],
                "seclists": [
                    "/acme/mary/webserver_list"
                ]
                }
            },
            "shape": "small",
            "storage_attachments": [ ]
            },
{
            "block_devices": { },
            "imagelist": "/acme/mary/dbserver",
            "label": "Database back-end for OS
            Commerce", "networking": {
                "eth0": {
                "dns": [
                    "db"
                ],
                "seclists": [
                    "/acme/mary/dbserver_list"
                ]
                }
            },
```

-continued

```
            "shape": "small",
            "storage_attachments": [
                {
                    "index": 1,
                    "volume": "/acme/mary/volume1"
                }
            ]
        }
    }
}
```

Cloud Resources (CRs) are inclusive but not limited to a) virtual machine, physical machine or a OS container, b) any Storage services provided a private or public cloud, c) any Networking services provided by private or public cloud, and d) any feature that is provided by the private or public cloud.

In configuring a Computational Resource (CR) in a Nimbula cloud, one can include Relationships and Instances. For Amazon or some other cloud these parameters will be different and orchestration can configure CRs on any cloud.

Relationships allows one to define relationships between various instances such as whether they should be launched on the same of a different node or the same or different cluster. Non-limiting examples of relationships element are: same node, different node, same cluster, and different cluster.

Each type of instance can be separately defined in the launch plan. For each instance type, the following parameters can be specified:

Shape A valid shape with the amount of RAM and the number of CPUs needed to run one instance.
Version The version number identifying which machine image to run from the image list.
tags (optional) A list of strings which will tag the instance for the end-user's uses. Creating a human-friendly tag for an instance allows one to identify a specific instance easily during instance listing. These tags are not available from within the instance. See User-defined parameters in orchestration (instance configurations).
networking (optional) The networking elements allow the specification of three sub-elements related to supported THE system network services: vEthernet, seclists and nat described below. Be careful when constructing the networking element as certain combinations of networking elements are not allowed together. vEthernet—vEthernets are discussed in About virtual ethernets (vEthernets). As vEthernets are not supported with security lists and NAT, the vEthernet field should either be omitted or set to the default vEthernet /nimbula/public/default if that NIC also has security lists and/or NAT specified. Setting the vethernet sub element to the empty string, " ", is not acceptable.
seclists—Error: Reference source not foundAn instance can belong to up to 64 security lists. For every customer, there is a default security list, /customer/default/default. If one launches a VM without a security list tag, it is assigned to the customer's default security list, nat—Network Address Translation is described in Using distributed NAT. The system's distributed NAT service provides public IP services to instances running in the system site. A launch plan can be used to:
Get a temporary IP from an IP pool for use by the instance during its lifetime, (ippool element)
Attach a persistent IP to a VM by referencing a pre-created IP reservation (ipreservation element).
storage attachments The volumes to attach to this instance with the following sub elements:
(optional) volume—Name of the storage volume to which the instance is attached. To be able to attach a volume to an instance, use permission is required on the storage volume and storageattachmentadd permission is needed under the instance namespace. index—The index is used to instruct the hypervisor to attach the storage volume to an instance as a particular device. For example, specifying index=1 results in the storage volume being exposed as either/dev/vda or /dev/sda depending on the virtio capability. Index=2 will be /dev/[sv]db and so on.
placement requirements (optional) These parameters are discussed in User-defined parameters in orchestration (instance configurations). A user must have use permission on a property to be able to specify it as a placement requirement in a launch plan.
Imagelist The full path name of one's image list
attributes (optional) Optional user-defined parameters that can be passed to an instance of this machine image when it is launched. See About user-defined attributes and parameters in orchestrations, images, and image lists.
Label A label that can be used to identify this instance in the launch plan when defining relationships between launch plan elements.
Site The site where one wants this instance to launch if not on the local site. For more about federation, see the system Cloud Administrator Guide.
account An account is a billing container associated with a customer. A customer administrator must create an account to be able to launch workloads in Amazon EC2 via the system Amazon EC2 proxy or update the default account to contain the relevant Amazon EC2 credentials. The default account can be used to launch workloads across the system sites and in this case does not need to be explicitly set. The account information is passed through to all calls to a remote site. A user needs use permission on an account that they use for federation purposes. Account information is passed through with any launch command: either the default account or an explicitly specified account is used. Whether or not an action is billable, irrespective of whether it is launched locally or on a remote system site, will depend on how billing is set up within the site and the billing arrangements with other system sites.

Orchestrations in JSON Format

Here is a collection of orchestrations for various purposes, presented as a sampler. For background see the section above on working with orchestrations. Specifically, this section gives examples on permissions; permanent IP reservation; multiple objects with dependencies; and nesting orchestrations. While this example is given in JSON format, the specification language is not limited to JSON. Instead, this is only an example.

Permissions

```
{
    "description": "permissions",
    "name": "/nimbula/public/permission1",
    "oplans": [
        {
            "ha_policy": "active", "label":
            "user-permissions",
            "obj_type": "permission/user",
```

```
            "objects": [
                {
                    "action": "GET",
                    "authorizer": "user:/root/root",
                    "object": "seclist:/acme/public/",
                    "subject": "group:/acme/testgroup1"
                }
            ]
        },
        {
            "ha_policy": "active",
            "label": "object-permissions",
            "obj_type": "permission/object",
            "objects": [
                {
                    "action": "GET",
                    "authorizer": "user:/root/root",
                    "object": "seclist:/acme/public/",
                    "subject": "group:/acme/testgroup1"
                }
            ]
        }
```

Permanent IP reservation

This orchestration creates and monitors an IP reservation.

```
{
    "name": "/acme/joeuser/nat1 ",
    "oplans": [
        {
            "ha_policy": "monitor",
            "label": "ipreservation",
            "obj_type": "ip/reservation",
            "objects": [
                {
                    "parentpool": "/acme/public/pool-1",
                    "permanent": "True"
                }
            ]
        }
    ]
}
```

Multiple Objects with Dependencies

This orchestration defines security lists (plan "A") and security rules (plan "B") for protecting a web server instance (plan "C"). First plan A is started, then plan B, and finally the web server in plan C is instantiated.

```
{
    "name": "/acme/public/dependency1",
    "oplans": [
        {
            "ha_policy": "active",
            "label": "A",
            "obj_type": "seclist",
            "objects": [
                {
                    "description": "orchestration: webserver seclist",
                    "name": "/acme/public/webserver"
                },
                {
                    "description": "orchestration: dbserver seclist",
                    "name": "/acme/public/dbserver"
                }
            ]
        },
        {
            "ha_policy": "active",
            "label": "B",
            "obj_type": "secrule",
            "objects": [
                {
                    "action": "PERMIT",
                    "application": "/acme/public/mysql",
                    "description": "orchestration: secrule",
                    "dst_list": "seclist:/acme/public/dbserver",
                    "name": "/acme/public/secrule",
                    "src_list": "seclist:/acme/public/webserver"
                }
            ]
        },
        {
            "ha_policy": "active",
            "label": "C",
            "obj_type": "launchplan",
            "objects": [
                {
                    "instances": [
                        {
                            "imagelist": "/acme/public/lucid64",
                            "label": "test_instance",
                            "name": "/acme/public/lucid64",
                            "shape": "small",
                            "user_data": { }
                        }
                    ]
                }
            ]
        }
    ],
    "relationships": [
        {
            "oplan": "B",
            "to_oplan": "A",
            "type": "depends"
        },
        {
            "oplan": "A",
            "to_oplan": "C",
            "type": "depends"
        }
    ]
}
```

Nesting Orchestrations

In this example orchestration, several other orchestrations are referred to by

```
{
    "name": "/acme/public/master1",
    "oplans": [
        {
            "ha_policy": "monitor",
            "label": "composite-orchestration",
            "obj_type": "orchestration",
            "objects": [
                {
                    "name": "/acme/public/sec1"
                },
                {
                    "name": "/acme/public/lp2"
                },
                {
                    "name": "/acme/public/nat1"
                },
                {
                    "name": "/acme/public/lp1"
                }
            ]
        }
    ]
}
```

Third Parties

The system not only allows users to orchestrate using their own created objects and processes, but third party created objects and processes as well. This allows for an extensible cloud where third party objects and processes are seamlessly integrated into the cloud and can show up in the API or CLI itself for complete availability. Using parameterized fields, templates can also be created for these orchestrations and shared amongst community of users. This will enable sharing of ideas amongst a community to enable multi cloud application stacks. Users can refer other orchestrations in their templates thereby enabling richer collaboration.

Troubleshooting/Status of an Orchestration

Orchestration also allows a developer to observe their entire use of the cloud at once. A master orchestration can display information about how all the interdependent orchestrations are running. If something isn't working correctly, the master orchestration can indicate so. The orchestration can also indicate if security rules have been changed. It will find faults throughout the cloud and report them. It will find faults on objects and orchestrations running on multiple clouds and report them as well.

Cloud Level Interface (CLI)

An example of a cloud level interface for the system is shown below:

```
{
    "name": "/nimbula/public/ol ",
    "oplans": [
    {
        "label" : "tinyplan",
            "obj_type": "launchplan",
            "objects": [
            {
                "instances" : [
                {
                    "shape" : "small",
                    "imagelist": /nimbula/public/tinycore",
                    "user_data": { },
                    "label": "test instance"
                }
                ]
            }
            ]
        "ha_policy": "active"
    },
    {
        "label" : "other-orchestration"
        "obj_type": "orchestration",
        "objects": [ "/nimbula/public/o2"]
    }
    ]
}
```

As can be seen, it consists of two orchestration plans: 'tinyplan,' which is a launchplan and 'other-orchestration,' which points to another orchestration. In this case 'adding' an orchestration is separated from 'starting' an orchestration. Since 'Start' is just changing the state of an object, the query arguments are provided as part of an update operation.

In this case, the CLI command would be nimbula-api start orchestration /nimbula/public/ol. RESTfully it will specify a query argument as part of update operation. For example, PUT http://api.<sitename>.nimbula/orchestration/nimbula/public/ol?action=START.

Performance and Scale

Load Balancing is achieved via distributing orchestrations across different orchestration managers. This way a single orchestration can point to multiple orchestration objects and can drive a whole hierarchy (all assigned to different managers).

CONCLUSION

The foregoing description, for purpose of explanation, has been described with reference to specific examples. However, the illustrative discussions above are not intended to be exhaustive or to limit the invention to the precise forms disclosed. Many modifications and variations are possible in view of the above teachings. This includes practicing the examples of the various subject matter described above in any combination. The examples were chosen and described in order to best explain the principles of the invention and its practical applications, to thereby enable others skilled in the art to best utilize the inventions with various modifications as are suited to the particular use contemplated.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of managing computer cloud resources, the method comprising:

receiving, by an orchestration system implemented by at least one server computer of a cloud computing system, through a programming interface, from a client system, information that defines an orchestration for performing one or more functions using a plurality of objects across a plurality of cloud service systems, wherein a first object of the plurality of objects is provided by a first cloud service system of the plurality of cloud service systems, wherein a second object of the plurality of objects is provided by a second cloud service system of the plurality of cloud service systems, wherein the first cloud service system is provided by a first cloud service provider and the second cloud service system is provided by a second cloud service provider, and wherein for each of the plurality of objects, the information indicates a plurality of parameters for an instance of the object, the plurality of parameters including a first parameter indicating site information specifying a location where to instantiate an instance of the object and a second parameter indicating an image list defining a path for the instance of the object;

generating, by the at least one server computer, a first cloud resource management plan for the orchestration for performing the one or more functions using the plurality of objects, wherein the first cloud resource management plan is generated based on the received information that defines the plurality of objects for the orchestration, wherein the generating the first cloud resource management plan includes grouping objects of the plurality of objects that have a first same type or configured to perform a first same function into a first group, and wherein the first group comprises the first object provided by the first cloud service provider;

adding, by the at least one server computer, a first policy regarding the first group of objects to the first cloud resource management plan based on the received information that defines the plurality of objects for the orchestration;

generating, by the at least one server computer, a second cloud resource management plan for the orchestration for performing the one or more functions using the plurality of objects, wherein the second cloud resource management plan is generated based on the received information that defines the plurality of objects for the orchestration, wherein the generating the second cloud resource management plan includes grouping objects of the plurality of objects that have a second same type or configured to perform a second same function into a second group, and wherein the second group comprises the second object provided by the second cloud service provider;

adding, by the at least one server computer, a second policy regarding the second group of objects to the second cloud resource management plan based on the received information that defines the plurality of objects for the orchestration;

defining, by the at least one server computer, a relationship between the first cloud resource management plan and the second cloud resource management plan to generate the orchestration based on the received information that defines the orchestration;

storing, by the at least one server computer and in at least one storage, the first cloud resource management plan and the second cloud resource management plan;

receiving, by the at least one server computer, through the programming interface, a command including an input parameter to perform the one or more functions for the orchestration;

retrieving, via the at least one server computer acting as an orchestration manager, the first cloud resource management plan and the second cloud resource management plan from the at least one storage based on the orchestration and the relationship between the first cloud resource management plan and the second cloud resource management plan; and executing, by the at least one server computer with at least one site controller of the orchestration system, the first cloud resource management plan and the second cloud resource management plan to perform, based on the input parameter, the one or more functions using the first object accessed from the first cloud service system and the second object accessed from the second cloud service system.

2. The method of claim 1, wherein the at least one server computer acts as an orchestration site for the orchestration system to receive the information, wherein the at least one server computer acts as an orchestration manager for the orchestration system to retrieve the first cloud resource management plan and the second cloud resource management plan, and wherein the orchestration site and the orchestration manager are further configured for communication over a distributed messaging bus.

3. The method of claim 2, wherein the communication includes sending information indicating whether the first cloud resource management plan and the second cloud resource management plan are ready for execution.

4. The method of claim 1, further comprising defining, by the at least one server computer, a relationship between the orchestration and another orchestration, wherein the another orchestration comprises a third cloud resource management plan.

5. The method of claim 4 wherein the third cloud resource management plan includes a third group of objects of the plurality of objects and a third policy regarding the third group of objects.

6. The method of claim 1, wherein the defining the relationship between the first cloud resource management plan and the second cloud resource management plan includes adding information regarding an interaction of the at least one group of cloud resources with other groups of cloud resources.

7. The method of claim 1, further comprising adding, by the at least one server computer, a first label to the first cloud resource management plan and a second label to the second cloud resource management plan, and adding, by the at least one server computer, a third object of the plurality of objects to the first cloud resource management plan, wherein:
the first label is different from the second label; and
the third object is a sub cloud resource management plan.

8. The method of claim 1, wherein the at least one site controller includes a cloud resource.

9. The method of claim 1, wherein the storage is at least one of a database and cloud storage.

10. A system of managing computer cloud resources, the system comprising:
at least one memory storage; and
at least one server computer of a cloud computing system, the at least one server computer being configured to:
receive, through a programming interface, from a client system, information that defines an orchestration for performing one or more functions using a plurality of objects across a plurality of cloud service systems, wherein a first object of the plurality of objects is provided by a first cloud service system of the plurality of cloud service systems, wherein a second object of the plurality of objects is provided by a second cloud service system of the plurality of cloud service systems, wherein the first cloud service system is provided by a first cloud service provider and the second cloud service system is provided by a second cloud service provider, and wherein for each of the plurality of objects, the information indicates a plurality of parameters for an instance of the object, the plurality of parameters including a first parameter indicating site information specifying a location where to instantiate an instance of the object and a second parameter indicating an image list defining a path for the instance of the object;
generate a first cloud resource management plan for the orchestration for performing the one or more functions using the plurality of objects, wherein the first cloud resource management plan is generated based on the received information that defines the plurality of objects for the orchestration, and wherein the generating the first cloud resource management plan includes grouping objects of the plurality of objects that have a first same type or configured to perform a first same function into a first group, and wherein the first group comprises the first object provided by the first cloud service provider;
add a first policy regarding the first group of objects to the first cloud resource management plan based on the received information that defines the plurality of objects for the orchestration;
generate a second cloud resource management plan for the orchestration for performing the one or more functions using the plurality of objects, wherein the second cloud resource management plan is generated based on the received information that defines the plurality of objects for the orchestration, wherein the generating the second cloud resource management plan includes grouping objects of the plurality of objects that have a second same type or configured to perform a second same function into a second group, and wherein the second group comprises the second object provided by the second cloud service provider;
add a second policy regarding the second group of objects to the second cloud resource management plan based on the received information that defines the plurality of objects for the orchestration;
define a relationship between the first cloud resource management plan and the second cloud resource management plan to generate the orchestration based on the received information that defines the orchestration;
store, in the at least one memory storage, the first cloud resource management plan and the second cloud resource management plan;
receive, through the programming interface, a command including an input parameter to perform the one or more functions for the orchestration;
retrieve the first cloud resource management plan and the second cloud resource management plan from the at least one storage based on the orchestration and the relationship between the first cloud resource management plan and the second cloud resource management plan; and
execute, using at least one site controller of the system the first cloud resource management plan and the second cloud resource management plan to perform, based on the input parameter, the one or more functions using the first object accessed from the first cloud service system and the second object accessed from the second cloud service system.

11. The system of claim 10, wherein the first object is at least one of, a virtual machine, a physical machine, an operating system, a storage service, a networking service, and an application service.

12. The system of claim 10, wherein the at least one server computer is further configured to define a relationship between the orchestration and another orchestration, wherein the another orchestration comprises a third cloud resource management plan.

13. The system of claim 12, wherein the third cloud resource management plan includes a third group of objects of the plurality of objects and a third policy regarding the third group of objects.

14. The system of claim 10, wherein the defining the relationship between the first cloud resource management plan and the second cloud resource management plan includes adding information regarding an interaction of the at least one group of cloud resources with other groups of cloud resources.

15. The system of claim 10, wherein the at least one server computer is further configured to add a first label to the first cloud resource management plan and a second label to the second cloud resource management plan, and adding, by the at least one server computer, a third object of the plurality of objects to the first cloud resource management plan, wherein:
the first label is different from the second label; and
the third object is a sub cloud resource management plan.

16. A non-transitory computer readable storage medium storing instructions that, when executed by one or more processors of a computing device, cause the computing device to perform a method comprising:
receiving information that defines an orchestration for performing one or more functions using a plurality of objects across a plurality of cloud service systems, wherein a first object of the plurality of objects is provided by a first cloud service system of the plurality of cloud service systems, wherein a second object of the plurality of objects is provided by a second cloud service system of the plurality of cloud service systems, wherein the first cloud service system is provided by a first cloud service provider and the second cloud service system is provided by a second cloud service provider, and wherein for each of the plurality of objects, the information indicates a plurality of parameters for an instance of the object, the plurality of parameters including a first parameter indicating site information specifying a location where to instantiate an instance of the object and a second parameter indicating an image list defining a path for the instance of the object;
generating a first cloud resource management plan for the orchestration for performing the one or more functions using the plurality of objects, wherein the first cloud resource management plan is generated based on the received information that defines the plurality of objects for the orchestration, wherein the generating the first cloud resource management plan includes grouping objects of the plurality of objects that have a first same type or configured to perform a first same function into a first group, and wherein the first group comprises the first object provided by the first cloud service provider;
adding a first policy regarding the first group of objects to the first cloud resource management plan based on the received information that defines the plurality of objects for the orchestration;
generating a second cloud resource management plan for the orchestration for performing the one or more functions using the plurality of objects, wherein the second cloud resource management plan is generated based on the received information that defines the plurality of objects for the orchestration, wherein the generating the second cloud resource management plan includes grouping objects of the plurality of objects that have a second same type or configured to perform a second same function into a second group, and wherein the second group comprises the second object provided by the second cloud service provider;
adding a second policy regarding the second group of objects to the second cloud resource management plan based on the received information that defines the plurality of objects for the orchestration;
defining a relationship between the first cloud resource management plan and the second cloud resource management plan to generate the orchestration based on the received information that defines the orchestration;
storing, in at least one storage, the first cloud resource management plan and the second cloud resource management plan;
receiving a command including an input parameter to perform the one or more functions for the orchestration;
retrieving the first cloud resource management plan and the second cloud resource management plan from the at least one storage based on the orchestration and the relationship between the first cloud resource management plan and the second cloud resource management plan; and
executing the first cloud resource management plan and the second cloud resource management plan to perform, based on the input parameter, the one or more functions using the first object accessed from the first cloud service system and the second object accessed from the second cloud service system.

17. The non-transitory computer readable storage medium of claim 16, wherein the first object is at least one of, a virtual machine, a physical machine, an operating system, a storage service, a networking service, and an application service.

18. The non-transitory computer readable storage medium of claim 16, wherein the method further comprises defining a relationship between the orchestration and another orchestration, wherein the another orchestration comprises a third cloud resource management plan.

19. The non-transitory computer readable storage medium of claim 18, wherein the third cloud resource management plan includes a third group of objects of the plurality of objects and a third policy regarding the third group of objects.

20. The non-transitory computer readable storage medium of claim 16, wherein the defining the relationship between the first cloud resource management plan and the second cloud resource management plan includes adding information regarding an interaction of the at least one group of cloud resources with other groups of cloud resources.

* * * * *

UNITED STATES PATENT AND TRADEMARK OFFICE
CERTIFICATE OF CORRECTION

PATENT NO. : 10,715,457 B2  
APPLICATION NO. : 14/459104  
DATED : July 14, 2020  
INVENTOR(S) : Palan et al.

Page 1 of 1

It is certified that error appears in the above-identified patent and that said Letters Patent is hereby corrected as shown below:

On the Title Page

On page 4, Column 1, under Other Publications, Line 20, delete "acrchitecture" and insert -- architecture --, therefor.

On page 4, Column 1, under Other Publications, Line 46, delete "Trivoli" and insert -- Tivoli --, therefor.

In the Specification

In Column 5, Line 26, delete "Op lan.'" and insert -- Oplan. --, therefor.

In Column 5, Line 28, delete "'high availability'" and insert -- 'high availability' --, therefor.

In Column 5, Line 33, delete "Orchestration.'" and insert -- 'Orchestration' --, therefor.

In Column 8, Line 67, delete "itself" and insert -- itself. --, therefor.

In Column 9, Line 5, delete "/acme/joeuser" and insert -- /acme/joeuser. --, therefor.

In Column 12, Line 3, delete "developers" and insert -- developers. --, therefor.

In Column 13, Line 44, delete "THE" and insert -- the --, therefor.

In Column 13, Line 55, delete "foundAn" and insert -- found. An --, therefor.

In Column 14, Line 8, delete "hypervisior" and insert -- hypervisor --, therefor.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*